US010587337B2

(12) United States Patent
Cheng et al.

(10) Patent No.: US 10,587,337 B2
(45) Date of Patent: Mar. 10, 2020

(54) INFORMATION SENDING AND RECEIVING METHOD AND SYSTEM, BASE STATION, AND FIRST USER EQUIPMENT

(71) Applicant: HUAWEI TECHNOLOGIES CO., LTD., Shenzhen, Guangdong (CN)

(72) Inventors: Yan Cheng, Beijing (CN); Lixia Xue, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 77 days.

(21) Appl. No.: 15/812,603

(22) Filed: Nov. 14, 2017

(65) Prior Publication Data

US 2018/0069622 A1 Mar. 8, 2018

Related U.S. Application Data

(63) Continuation of application No. PCT/CN2015/079050, filed on May 15, 2015.

(51) Int. Cl.
*H04B 7/26* (2006.01)
*H04L 1/16* (2006.01)
(Continued)

(52) U.S. Cl.
CPC .............. *H04B 7/26* (2013.01); *H04L 1/16* (2013.01); *H04L 1/1854* (2013.01);
(Continued)

(58) Field of Classification Search
None
See application file for complete search history.

(56) References Cited

U.S. PATENT DOCUMENTS

2012/0195272 A1    8/2012   Hong et al.
2013/0194980 A1    8/2013   Yin et al.
(Continued)

FOREIGN PATENT DOCUMENTS

CN       101141187 A     3/2008
CN       102075310 A     5/2011
(Continued)

OTHER PUBLICATIONS

3GPP TSG-RAN WG1 Meeting #74, "Downlink ACK transmission", NSN, Agenda 6.3.1, Barcelona, Spain, Aug. 19-23, 2013, R1-133728, 7 pgs.
(Continued)

*Primary Examiner* — Diane L Lo
(74) *Attorney, Agent, or Firm* — Maier & Maier, PLLC

(57) ABSTRACT

The present invention discloses a method, including: determining, by first user equipment, a frame structure of a first serving cell; and sending and receiving, by the first user equipment in the first serving cell, information based on the frame structure of the first serving cell, where: in the frame structure of the first serving cell, one radio frame includes at least one first subframe and at least one second subframe, and both the first subframe and the second subframe include a symbol used for downlink transmission, a guard period, and a symbol used for uplink transmission; in the first subframe, a quantity of symbols used for downlink transmission is greater than a quantity of symbols used for uplink transmission; and in the second subframe, a quantity of symbols used for downlink transmission is less than a quantity of symbols used for uplink transmission.

17 Claims, 7 Drawing Sheets

S10

First user equipment determines a frame structure of a first serving cell

S11

The first user equipment sends and receives, in the first serving cell, information based on the frame structure of the first serving cell

(51) Int. Cl.

| | | |
|---|---|---|
| *H04L 5/00* | (2006.01) | |
| *H04L 5/14* | (2006.01) | |
| *H04L 1/18* | (2006.01) | |
| *H04W 72/04* | (2009.01) | |

(52) U.S. Cl.
CPC ............ *H04L 1/1893* (2013.01); *H04L 5/001* (2013.01); *H04L 5/0032* (2013.01); *H04L 5/0053* (2013.01); *H04L 5/0055* (2013.01); *H04L 5/143* (2013.01); *H04L 5/1469* (2013.01); *H04W 72/042* (2013.01); *H04W 72/0413* (2013.01)

(56) References Cited

U.S. PATENT DOCUMENTS

| | | | |
|---|---|---|---|
| 2013/0286902 A1 | 10/2013 | Chen et al. | |
| 2013/0322355 A1 | 12/2013 | Seo et al. | |
| 2016/0073354 A1* | 3/2016 | Seo ..................... | H04L 5/0073 455/522 |
| 2016/0212743 A1* | 7/2016 | Sun ..................... | H04L 5/0053 |
| 2016/0248553 A1 | 8/2016 | Shimezawa et al. | |

FOREIGN PATENT DOCUMENTS

| | | |
|---|---|---|
| CN | 102223214 A | 10/2011 |
| CN | 102377475 A | 3/2012 |
| CN | 103026653 A | 4/2013 |
| CN | 103516487 A | 1/2014 |
| CN | 104067681 A | 9/2014 |
| CN | 104247314 A | 12/2014 |
| WO | 2015046358 A1 | 4/2015 |

OTHER PUBLICATIONS

International Search Report dated Feb. 15, 2016, in corresponding International Patent Application No. PCT/CN2015/079050, 4 pgs.
Catt, et al., "Special Subframe Design for Optimized TDD type 2," TSG-RAN WG1 #51, R1-074822, Jeju, Korea, Nov. 5-9, 2007, XP50108283A, 3 pgs.
"3$^{rd}$ Generation Partnership Project; Technical Specification Group Radio Access Network; Evolved Universal Terrestrial Radio Access (E-UTRA); Physical layer procedures," 3GPP TS 36.213 V12.5.0, Mar. 2015, XP50928106A, 239 pgs.
Extended European Search Report dated Feb. 15, 2018, in corresponding European Patent Application No. 15892103.1, 9 pgs.
International Search Report dated Feb. 15, 2016 in corresponding International Patent Application No. PCT/CN2015/079050, filed May 15, 2015.
CATT, "ACK/NACKs transmission in UpPTS," 3GPP TSG RAN WG1 meeting #51bis, Sevilla, Spain, Jan. 14-18, 2008, R1-080175 (7 pp.).
Office Action, dated Apr. 2, 2019, Chinese Application No. 201580080042.3 (8 pp.).

* cited by examiner

INFORMATION SENDING AND RECEIVING METHOD AND SYSTEM, BASE STATION, AND FIRST USER EQUIPMENT

CROSS-REFERENCE TO RELATED APPLICATIONS

This application is a continuation of international application No. PCT/CN2015/079050, filed on May 15, 2015, the disclosure of which is hereby incorporated by reference in its entirety.

TECHNICAL FIELD

The present invention relates to the communications field, and in particular, to an information sending and receiving method and system, a base station, and first user equipment.

BACKGROUND

An existing Long Term Evolution (LTE) system includes two frame structures: a frame structure type 1 that is applied to frequency division duplex (FDD), as shown in FIG. 1, and a frame structure type 2 that is applied to time division duplex (TDD), as shown in FIG. 2. For the TDD, the existing system includes seven uplink-downlink configurations.

In an LTE system, to support hybrid automatic retransmission, user equipment needs to feed back, to a base station by using a physical uplink control channel (PUCCH) and a physical uplink shared channel (PUSCH), a hybrid automatic repeat request-acknowledgement (HARQ-ACK) of physical downlink shared channel (PDSCH) transmission. The hybrid automatic repeat request-acknowledgement may be briefly referred to as an acknowledgement (ACK)/a negative acknowledgement (NACK). The user equipment needs to receive, by using a physical hybrid automatic repeat request indicator channel (PHICH), a hybrid automatic repeat request-acknowledgement HARQ-ACK corresponding to the physical uplink shared channel.

In the existing system, for the FDD, an HARQ-ACK corresponding to a PDSCH transmitted in a downlink subframe n−4 is fed back in an uplink subframe n. For the TDD, an HARQ-ACK corresponding to a PDSCH transmitted in a subframe n−k is fed back in an uplink subframe n, where k belongs to a set K. A definition of K for each TDD uplink-downlink configuration is shown in Table 1. For example, for a TDD uplink-downlink configuration 1, a subframe 7 is an uplink subframe and a corresponding set K is {7, 6}. A subframe 1 is reached after the subframe 7 is shifted forward by six subframes, and a subframe 0 is reached after the subframe 7 is shifted forward by seven subframes. Therefore, an HARQ-ACK corresponding to PDSCHs transmitted in the subframe 0 and the subframe 1 is fed back in the subframe 7.

TABLE 1

| Uplink-downlink configuration | Downlink association set K for a TDD system Subframe n | | | | | | | | | |
|---|---|---|---|---|---|---|---|---|---|---|
| | 0 | 1 | 2 | 3 | 4 | 5 | 6 | 7 | 8 | 9 |
| 0 | | | 6 | | 4 | | | 6 | | 4 |
| 1 | | | 7, 6 | 4 | | | | 7, 6 | 4 | |
| 2 | | | 8, 7, 4, 6 | | | | | 8, 7, 4, 6 | | |
| 3 | | | 7, 6, 11 | 6, 5 | 5, 4 | | | | | |
| 4 | | | 12, 8, 7, 11 | 6, 5, 4, 7 | | | | | | |
| 5 | | | 13, 12, 9, 8, 7, 5, 4, 11, 6 | | | | | | | |
| 6 | | | 7 | 7 | 5 | | | 7 | 7 | |

It can be learned from Table 1 that the existing TDD system has different HARQ-ACK timing for different uplink-downlink configurations, and has higher complexity compared with an FDD system.

SUMMARY

In view of this, embodiments of the present invention provide an information sending and receiving method and system, a base station, and first user equipment, so as to ensure that a TDD system has same HARQ-ACK timing for different uplink-downlink configurations and can coexist with an existing TDD system.

A first aspect provides first user equipment, where the first user equipment includes: a first frame determining module, configured to determine a frame structure of a first serving cell; and a first transceiver module, connected to the first frame determining module, and configured to send and receive, in the first serving cell, information based on the frame structure of the first serving cell, where: in the frame structure of the first serving cell, one radio frame includes at least one first subframe and at least one second subframe, and both the first subframe and the second subframe include a symbol used for downlink transmission, a guard period, and a symbol used for uplink transmission; in the first subframe, a quantity of symbols used for downlink transmission is greater than a quantity of symbols used for uplink transmission; and in the second subframe, a quantity of symbols used for downlink transmission is less than a quantity of symbols used for uplink transmission.

With reference to the first aspect, in a first possible implementation, in the frame structure of the first serving cell, each subframe is a 1 ms subframe, the first subframe includes 12 symbols used for downlink transmission, a guard period with duration of one symbol, and one symbol used for uplink transmission, and the second subframe includes one symbol used for downlink transmission, a guard period with duration of one symbol, and 12 symbols used for uplink transmission.

With reference to the first aspect or the first possible implementation of the first aspect, in a second possible implementation, in the frame structure of the first serving cell, if a subframe l is the first subframe or a downlink subframe, a subframe l+4 is the first subframe, the second subframe, or an uplink subframe, and l is a nonnegative integer.

With reference to the first aspect or the first possible implementation of the first aspect, in a third possible implementation, an uplink-downlink configuration of the first serving cell is an uplink-downlink configuration 0, an uplink-downlink configuration 1, an uplink-downlink configuration 3, or an uplink-downlink configuration 4.

With reference to the third possible implementation of the first aspect, in a fourth possible implementation, when the uplink-downlink configuration of the first serving cell is the uplink-downlink configuration 0, the radio frame includes 10 subframes, where a subframe 0 and a subframe 5 are the first subframes, a subframe 1 and a subframe 6 are either downlink subframes or the first subframes, a subframe 2 and a subframe 7 are the second subframes, and a subframe 3, a subframe 4, a subframe 8, and a subframe 9 are uplink subframes; when the uplink-downlink configuration of the first serving cell is the uplink-downlink configuration 1, the radio frame includes 10 subframes, where a subframe 0, a subframe 4, a subframe 5, and a subframe 9 are the first subframes, a subframe 1 and a subframe 6 are either downlink subframes or the first subframes, a subframe 2 and a subframe 7 are the second subframes, and a subframe 3 and a subframe 8 are uplink subframes; when the uplink-downlink configuration of the first serving cell is the uplink-downlink configuration 3, the radio frame includes 10 subframes, where a subframe 0, a subframe 1, a subframe 5, and a subframe 9 are the first subframes, a subframe 6, a subframe 7, and a subframe 8 are either downlink subframes or the first subframes, a subframe 2 is the second subframe, and a subframe 3 and a subframe 4 are uplink subframes; or when the uplink-downlink configuration of the first serving cell is the uplink-downlink configuration 4, the radio frame includes 10 subframes, where a subframe 0, a subframe 1, a subframe 4, a subframe 5, a subframe 8, and a subframe 9 are the first subframes, a subframe 6 and a subframe 7 are either downlink subframes or the first subframes, a subframe 2 is the second subframe, and a subframe 3 is an uplink subframe.

With reference to the first aspect, or the first, the second, the third, or the fourth possible implementation of the first aspect, in a fifth possible implementation, the first transceiver module is configured to: receive, in a subframe n−4, a physical downlink shared channel or a downlink control channel that indicates downlink semi-persistent scheduling release, where the physical downlink shared channel or the downlink control channel that indicates the downlink semi-persistent scheduling release is transmitted in the first serving cell, and n is a nonnegative integer; and send, in a subframe n, a hybrid automatic repeat request acknowledgement corresponding to the physical downlink shared channel or the downlink control channel in the subframe n−4, where the hybrid automatic repeat request acknowledgement corresponding to the physical downlink shared channel or the downlink control channel is transmitted in the first serving cell.

With reference to the first aspect, or the first, the second, the third, the fourth, or the fifth possible implementation of the first aspect, in a sixth possible implementation, the first transceiver module is configured to: receive, in a subframe a downlink control channel scheduling a physical uplink shared channel; and send, in a subframe i+k1, the physical uplink shared channel scheduled by the downlink control channel, where the physical uplink shared channel scheduled by the downlink control channel is transmitted in the first serving cell, i is a nonnegative integer, k1 is a positive integer, a value of k1 is determined according to timing when an uplink-downlink configuration in a frame structure type 2 is the same as the uplink-downlink configuration of the first serving cell, and the frame structure type 2 is a frame structure type of Long Term Evolution release 8, release 9, release 10, release 11, or release 12.

With reference to the first aspect, or the first, the second, the third, the fourth, or the fifth possible implementation of the first aspect, in a seventh possible implementation, the first transceiver module is configured to: send a physical uplink shared channel in a subframe j, where the physical uplink shared channel is transmitted in the first serving cell; and receive, in a subframe j+k2, a hybrid automatic repeat request acknowledgement corresponding to the physical uplink shared channel, where j is a nonnegative integer, k2 is a positive integer, a value of k2 is determined according to timing when an uplink-downlink configuration in a frame structure type 2 is the same as the uplink-downlink configuration of the first serving cell, and the frame structure type 2 is a frame structure type of Long Term Evolution release 8, release 9, release 10, release 11, or release 12.

With reference to the first aspect, or the first, the second, the third, the fourth, or the fifth possible implementation of the first aspect, in an eighth possible implementation, the first transceiver module is configured to: receive, in a subframe m, a hybrid automatic repeat request acknowledgement corresponding to a physical uplink shared channel; and send, in a subframe m+k3, the physical uplink shared channel corresponding to the hybrid automatic repeat request acknowledgement, where the physical uplink shared channel corresponding to the hybrid automatic repeat request acknowledgement is transmitted in the first serving cell, m is a nonnegative integer, k3 is a positive integer, a value of k3 is determined according to timing when an uplink-downlink configuration in a frame structure type 2 is the same as the uplink-downlink configuration of the first serving cell, and the frame structure type 2 is a frame structure type of Long Term Evolution release 8, release 9, release 10, release 11, or release 12.

A second aspect provides an information sending and receiving method, including: determining, by first user equipment, a frame structure of a first serving cell; and sending and receiving, by the first user equipment in the first serving cell, information based on the frame structure of the first serving cell, where: in the frame structure of the first serving cell, one radio frame includes at least one first subframe and at least one second subframe, and both the first subframe and the second subframe include a symbol used for downlink transmission, a guard period, and a symbol used for uplink transmission; in the first subframe, a quantity of symbols used for downlink transmission is greater than a quantity of symbols used for uplink transmission; and in the second subframe, a quantity of symbols used for downlink transmission is less than a quantity of symbols used for uplink transmission.

With reference to the second aspect, in a first possible implementation, in the frame structure of the first serving cell, each subframe is a 1 ms subframe, the first subframe includes 12 symbols used for downlink transmission, a guard period with duration of one symbol, and one symbol used for uplink transmission, and the second subframe includes one symbol used for downlink transmission, a guard period with duration of one symbol, and 12 symbols used for uplink transmission.

With reference to the second aspect or the first possible implementation of the second aspect, in a second possible implementation, in the frame structure of the first serving cell, if a subframe l is the first subframe or a downlink subframe, a subframe l+4 is the first subframe, the second subframe, or an uplink subframe, and l is a nonnegative integer.

With reference to the second aspect or the first possible implementation of the second aspect, in a third possible implementation, an uplink-downlink configuration of the first serving cell is an uplink-downlink configuration 0, an uplink-downlink configuration 1, an uplink-downlink configuration 3, or an uplink-downlink configuration 4.

With reference to the third possible implementation of the second aspect, in a fourth possible implementation, when the uplink-downlink configuration of the first serving cell is the uplink-downlink configuration 0, the radio frame includes 10 subframes, where a subframe 0 and a subframe 5 are the first subframes, a subframe 1 and a subframe 6 are either downlink subframes or the first subframes, a subframe 2 and a subframe 7 are the second subframes, and a subframe 3, a subframe 4, a subframe 8, and a subframe 9 are uplink subframes; when the uplink-downlink configuration of the first serving cell is the uplink-downlink configuration 1, the radio frame includes 10 subframes, where a subframe 0, a subframe 4, a subframe 5, and a subframe 9 are the first subframes, a subframe 1 and a subframe 6 are either downlink subframes or the first subframes, a subframe 2 and a subframe 7 are the second subframes, and a subframe 3 and a subframe 8 are uplink subframes; when the uplink-downlink configuration of the first serving cell is the uplink-downlink configuration 3, the radio frame includes 10 subframes, where a subframe 0, a subframe 1, a subframe 5, and a subframe 9 are the first subframes, a subframe 6, a subframe 7, and a subframe 8 are either downlink subframes or the first subframes, a subframe 2 is the second subframe, and a subframe 3 and a subframe 4 are uplink subframes; or when the uplink-downlink configuration of the first serving cell is the uplink-downlink configuration 4, the radio frame includes 10 subframes, where a subframe 0, a subframe 1, a subframe 4, a subframe 5, a subframe 8, and a subframe 9 are the first subframes, a subframe 6 and a subframe 7 are either downlink subframes or the first subframes, a subframe 2 is the second subframe, and a subframe 3 is an uplink subframe.

With reference to the second aspect, or the first, the second, the third, or the fourth possible implementation of the second aspect, in a fifth possible implementation, the sending and receiving, by the first user equipment in the first serving cell, information based on the frame structure of the first serving cell includes: receiving, by the first user equipment in a subframe n−4, a physical downlink shared channel or a downlink control channel that indicates downlink semi-persistent scheduling release, where the physical downlink shared channel or the downlink control channel that indicates the downlink semi-persistent scheduling release is transmitted in the first serving cell, and n is a nonnegative integer; and sending, by the first user equipment in a subframe n, a hybrid automatic repeat request acknowledgement corresponding to the physical downlink shared channel or the downlink control channel in the subframe n−4, where the hybrid automatic repeat request acknowledgement corresponding to the physical downlink shared channel or the downlink control channel is transmitted in the first serving cell.

With reference to the second aspect, or the first, the second, the third, the fourth, or the fifth possible implementation of the second aspect, in a sixth possible implementation, the sending and receiving, by the first user equipment in the first serving cell, information based on the frame structure of the first serving cell includes: receiving, by the first user equipment in a subframe i, a downlink control channel scheduling a physical uplink shared channel; and sending, by the first user equipment in a subframe i+k1, the physical uplink shared channel scheduled by the downlink control channel, where the physical uplink shared channel scheduled by the downlink control channel is transmitted in the first serving cell, i is a nonnegative integer, k1 is a positive integer, a value of k1 is determined according to timing when an uplink-downlink configuration in a frame structure type 2 is the same as the uplink-downlink configuration of the first serving cell, and the frame structure type 2 is a frame structure type of Long Term Evolution release 8, release 9, release 10, release 11, or release 12.

With reference to the second aspect, or the first, the second, the third, the fourth, or the fifth possible implementation of the second aspect, in a seventh possible implementation, the sending and receiving, by the first user equipment in the first serving cell, information based on the frame structure of the first serving cell includes: sending, by the first user equipment, a physical uplink shared channel in a subframe j, where the physical uplink shared channel is transmitted in the first serving cell; and receiving, by the first user equipment in a subframe j+k2, a hybrid automatic repeat request acknowledgement corresponding to the physical uplink shared channel, where j is a nonnegative integer, k2 is a positive integer, a value of k2 is determined according to timing when an uplink-downlink configuration in a frame structure type 2 is the same as the uplink-downlink configuration of the first serving cell, and the frame structure type 2 is a frame structure type of Long Term Evolution release 8, release 9, release 10, release 11, or release 12.

With reference to the second aspect, or the first, the second, the third, the fourth, or the fifth possible implementation of the second aspect, in an eighth possible implementation, the sending and receiving, by the first user equipment in the first serving cell, information based on the frame structure of the first serving cell includes: receiving, by the first user equipment in a subframe m, a hybrid automatic repeat request acknowledgement corresponding to a physical uplink shared channel; and sending, by the first user equipment in a subframe m+k3, the physical uplink shared channel corresponding to the hybrid automatic repeat request acknowledgement, where the physical uplink shared channel corresponding to the hybrid automatic repeat request acknowledgement is transmitted in the first serving cell, m is a nonnegative integer, k3 is a positive integer, a value of k3 is determined according to timing when an uplink-downlink configuration in a frame structure type 2 is the same as the uplink-downlink configuration of the first serving cell, and the frame structure type 2 is a frame structure type of Long Term Evolution release 8, release 9, release 10, release 11, or release 12.

A third aspect provides a base station, including: a second frame determining module, configured to determine a frame structure of a first serving cell of first user equipment; and a second transceiver module, connected to the second frame determining module, and configured to send or receive, in the first serving cell, information to or from the first user equipment based on the frame structure, where: in the frame structure of the first serving cell, one radio frame includes at least one first subframe and at least one second subframe, and both the first subframe and the second subframe include a symbol used for downlink transmission, a guard period, and a symbol used for uplink transmission; in the first subframe, a quantity of symbols used for downlink transmission is greater than a quantity of symbols used for uplink transmission; and in the second subframe, a quantity of symbols used for downlink transmission is less than a quantity of symbols used for uplink transmission.

With reference to the third aspect, in a first possible implementation, in the frame structure of the first serving cell, each subframe is a 1 ms subframe, the first subframe includes 12 symbols used for downlink transmission, a guard period with duration of one symbol, and one symbol used for uplink transmission, and the second subframe includes one symbol used for downlink transmission, a guard period with duration of one symbol, and 12 symbols used for uplink transmission.

With reference to the third aspect or the first possible implementation of the third aspect, in a second possible implementation, in the frame structure of the first serving cell, if a subframe l is the first subframe or a downlink subframe, a subframe l+4 is the first subframe, the second subframe, or an uplink subframe, and l is a nonnegative integer.

With reference to the third aspect, or the first or the second possible implementation of the third aspect, in a third possible implementation, an uplink-downlink configuration of the first serving cell is an uplink-downlink configuration 0, an uplink-downlink configuration 1, an uplink-downlink configuration 3, or an uplink-downlink configuration 4.

With reference to the third possible implementation of the third aspect, in a fourth possible implementation, when the uplink-downlink configuration of the first serving cell is the uplink-downlink configuration 0, the radio frame includes 10 subframes, where a subframe 0 and a subframe 5 are the first subframes, a subframe 1 and a subframe 6 are either downlink subframes or the first subframes, a subframe 2 and a subframe 7 are the second subframes, and a subframe 3, a subframe 4, a subframe 8, and a subframe 9 are uplink subframes; when the uplink-downlink configuration of the first serving cell is the uplink-downlink configuration 1, the radio frame includes 10 subframes, where a subframe 0, a subframe 4, a subframe 5, and a subframe 9 are the first subframes, a subframe 1 and a subframe 6 are either downlink subframes or the first subframes, a subframe 2 and a subframe 7 are the second subframes, and a subframe 3 and a subframe 8 are uplink subframes; when the uplink-downlink configuration of the first serving cell is the uplink-downlink configuration 3, the radio frame includes 10 subframes, where a subframe 0, a subframe 1, a subframe 5, and a subframe 9 are the first subframes, a subframe 6, a subframe 7, and a subframe 8 are either downlink subframes or the first subframes, a subframe 2 is the second subframe, and a subframe 3 and a subframe 4 are uplink subframes; or when the uplink-downlink configuration of the first serving cell is the uplink-downlink configuration 4, the radio frame includes 10 subframes, where a subframe 0, a subframe 1, a subframe 4, a subframe 5, a subframe 8, and a subframe 9 are the first subframes, a subframe 6 and a subframe 7 are either downlink subframes or the first subframes, a subframe 2 is the second subframe, and a subframe 3 is an uplink subframe.

With reference to the third aspect, or the first, the second, the third, or the fourth possible implementation of the third aspect, in a fifth possible implementation, the second transceiver module is configured to: send, to the first user equipment in a subframe n−4, a physical downlink shared channel or a downlink control channel that indicates downlink semi-persistent scheduling release, where the physical downlink shared channel or the downlink control channel that indicates the downlink semi-persistent scheduling release is transmitted in the first serving cell, and n is a nonnegative integer; and receive, in a subframe n, a hybrid automatic repeat request acknowledgement that is fed back by the first user equipment and that is corresponding to the physical downlink shared channel or the downlink control channel in the subframe n−4, where the hybrid automatic repeat request acknowledgement corresponding to the physical downlink shared channel or the downlink control channel is transmitted in the first serving cell.

With reference to the third aspect, or the first, the second, the third, or the fourth possible implementation of the third aspect, in a sixth possible implementation, the second transceiver module is configured to: send, to the first user equipment in a subframe i, a downlink control channel scheduling a physical uplink shared channel; and receive, in a subframe i+k1, the physical uplink shared channel scheduled by the downlink control channel, where the physical uplink shared channel scheduled by the downlink control channel is transmitted in the first serving cell, i is a nonnegative integer, k1 is a positive integer, a value of k1 is determined according to timing when an uplink-downlink configuration in a frame structure type 2 is the same as the uplink-downlink configuration of the first serving cell, and the frame structure type 2 is a frame structure type of Long Term Evolution release 8, release 9, release 10, release 11, or release 12.

With reference to the third aspect, or the first, the second, the third, or the fourth possible implementation of the third aspect, in a seventh possible implementation, the second transceiver module is configured to: receive, in a subframe j, a physical uplink shared channel sent by the first user equipment, where the physical uplink shared channel sent by the first user equipment is transmitted in the first serving cell; and send, in a subframe j+k2, a hybrid automatic repeat request acknowledgement corresponding to the physical uplink shared channel, where j is a nonnegative integer, k2 is a positive integer, a value of k2 is determined according to timing when an uplink-downlink configuration in a frame structure type 2 is the same as the uplink-downlink configuration of the first serving cell, and the frame structure type 2 is a frame structure type of Long Term Evolution release 8, release 9, release 10, release 11, or release 12.

With reference to the third aspect, or the first, the second, the third, or the fourth possible implementation of the third aspect, in an eighth possible implementation, the second transceiver module is configured to: send, in a subframe m, a hybrid automatic repeat request acknowledgement that is sent by the first user equipment and that is corresponding to a physical uplink shared channel; and receive, in a subframe m+k3, physical uplink shared channel retransmission, where the physical uplink shared channel retransmission is transmitted in the first serving cell, m is a nonnegative integer, k3 is a positive integer, a value of k3 is determined according to timing when an uplink-downlink configuration in a frame structure type 2 is the same as the uplink-downlink configuration of the first serving cell, and the frame structure type 2 is a frame structure type of Long Term Evolution release 8, release 9, release 10, release 11, or release 12.

With reference to the third aspect, or the first, the second, the third, the fourth, the fifth, the sixth, the seventh, or the eighth possible implementation of the third aspect, in a ninth possible implementation, the second frame determining module is further configured to determine a frame structure of a second serving cell, where the second serving cell is a serving cell of second user equipment; and the second transceiver module is further configured to send or receive, in the second serving cell, information to or from the second user equipment based on the frame structure of the second serving cell, where the frame structure of the second serving cell is the same as the frame structure type 2 of Long Term Evolution release 8, release 9, release 10, release 11, or release 12, and a frequency resource of the second serving cell is adjacent to or the same as a frequency resource of the first serving cell.

With reference to the ninth possible implementation of the third aspect, in a tenth possible implementation, in an eleventh possible implementation, when the uplink-downlink configuration of the first serving cell is the uplink-downlink configuration 0, an uplink-downlink configuration of the second serving cell is an uplink-downlink configuration 1; when the uplink-downlink configuration of the first serving cell is the uplink-downlink configuration 1, an uplink-downlink configuration of the second serving cell is an uplink-downlink configuration 2; when the uplink-downlink configuration of the first serving cell is the uplink-downlink configuration 3, an uplink-downlink configuration of the second serving cell is an uplink-downlink configuration 4; or when the uplink-downlink configuration of the first serving cell is the uplink-downlink configuration 4, an uplink-downlink configuration of the second serving cell is an uplink-downlink configuration 5.

With reference to the ninth or the tenth possible implementation of the third aspect, in an eleventh possible implementation, a special subframe configuration in the frame structure of the second serving cell is a special subframe configuration 5 or a special subframe configuration 0.

With reference to the ninth, the tenth, or the eleventh possible implementation of the third aspect, in a twelfth possible implementation, 11 symbols are shifted between a subframe of the first serving cell and that of the second serving cell.

With reference to the ninth, the tenth, the eleventh, or the twelfth possible implementation of the third aspect, in a thirteenth possible implementation, the second transceiver module is further configured to indicate a start symbol of a physical downlink shared channel for the second user equipment, where the start symbol of the physical downlink shared channel is the fourth symbol.

With reference to the ninth, the tenth, the eleventh, the twelfth, or the thirteenth possible implementation of the third aspect, in a fourteenth possible implementation, the second transceiver module is further configured to indicate, for the second user equipment, a transmission mode corresponding to a physical downlink shared channel, where the transmission mode is a transmission mode 10.

With reference to the ninth, the tenth, the eleventh, the twelfth, the thirteenth, or the fourteenth possible implementation of the third aspect, in a fifteenth possible implementation, the second transceiver module is further configured to send, in a downlink subframe n1, a physical downlink shared channel to the second user equipment in the second serving cell, where a start symbol of the physical downlink shared channel transmission is the fourth symbol in the downlink subframe n1, and n1 is a nonnegative integer.

A fourth aspect provides an information sending and receiving method, including: determining, by a base station, a frame structure of a first serving cell of first user equipment; and sending or receiving, by the base station in the first serving cell, information to or from the first user equipment based on the frame structure, where: in the frame structure of the first serving cell, one radio frame includes at least one first subframe and at least one second subframe, and both the first subframe and the second subframe include a symbol used for downlink transmission, a guard period, and a symbol used for uplink transmission; in the first subframe, a quantity of symbols used for downlink transmission is greater than a quantity of symbols used for uplink transmission; and in the second subframe, a quantity of symbols used for downlink transmission is less than a quantity of symbols used for uplink transmission.

With reference to the fourth aspect, in a first possible implementation, in the frame structure of the first serving cell, each subframe is a 1 ms subframe, the first subframe includes 12 symbols used for downlink transmission, a guard period with duration of one symbol, and one symbol used for uplink transmission, and the second subframe includes one symbol used for downlink transmission, a guard period with duration of one symbol, and 12 symbols used for uplink transmission.

With reference to the fourth aspect, or the first possible implementation of the fourth aspect, in a second possible implementation, in the frame structure of the first serving cell, if a subframe l is the first subframe or a downlink subframe, a subframe l+4 is the first subframe, the second subframe, or an uplink subframe, and l is a nonnegative integer.

With reference to the fourth aspect, or the first or the second possible implementation of the fourth aspect, in a third possible implementation, an uplink-downlink configuration of the first serving cell is an uplink-downlink configuration 0, an uplink-downlink configuration 1, an uplink-downlink configuration 3, or an uplink-downlink configuration 4.

With reference to the third possible implementation of the fourth aspect, in a fourth possible implementation, when the uplink-downlink configuration of the first serving cell is the uplink-downlink configuration 0, the radio frame includes 10 subframes, where a subframe 0 and a subframe 5 are the first subframes, a subframe 1 and a subframe 6 are either downlink subframes or the first subframes, a subframe 2 and a subframe 7 are the second subframes, and a subframe 3, a subframe 4, a subframe 8, and a subframe 9 are uplink subframes; when the uplink-downlink configuration of the first serving cell is the uplink-downlink configuration 1, the radio frame includes 10 subframes, where a subframe 0, a subframe 4, a subframe 5, and a subframe 9 are the first subframes, a subframe 1 and a subframe 6 are either downlink subframes or the first subframes, a subframe 2 and a subframe 7 are the second subframes, and a subframe 3 and a subframe 8 are uplink subframes; when the uplink-downlink configuration of the first serving cell is the uplink-downlink configuration 3, the radio frame includes 10 subframes, where a subframe 0, a subframe 1, a subframe 5, and a subframe 9 are the first subframes, a subframe 6, a subframe 7, and a subframe 8 are either downlink subframes or the first subframes, a subframe 2 is the second subframe, and a subframe 3 and a subframe 4 are uplink subframes; or when the uplink-downlink configuration of the first serving cell is the uplink-downlink configuration 4, the radio frame includes 10 subframes, where a subframe 0, a subframe 1, a subframe 4, a subframe 5, a subframe 8, and a subframe 9 are the first subframes, a subframe 6 and a subframe 7 are either downlink subframes or the first subframes, a subframe 2 is the second subframe, and a subframe 3 is an uplink subframe.

With reference to the fourth aspect, or the first, the second, the third, or the fourth possible implementation of the fourth aspect, in a fifth possible implementation, the sending or receiving, by the base station in the first serving cell, information to or from the first user equipment based on the frame structure includes: sending, by the base station to the first user equipment in a subframe n−4, a physical downlink shared channel or a downlink control channel that indicates downlink semi-persistent scheduling release, where the physical downlink shared channel or the downlink control channel that indicates the downlink semi-persistent scheduling release is transmitted in the first serving cell, and n is a nonnegative integer; and receiving, by the base station in a subframe n, a hybrid automatic repeat request acknowledgement that is fed back by the first user equipment and that is corresponding to the physical downlink shared channel or the downlink control channel in the subframe n−4, where the hybrid automatic repeat request acknowledgement corresponding to the physical downlink shared channel or the downlink control channel is transmitted in the first serving cell.

With reference to the fourth aspect, or the first, the second, the third, or the fourth possible implementation of the fourth aspect, in a sixth possible implementation, the sending or receiving, by the base station in the first serving cell, information to or from the first user equipment based on the frame structure includes: sending, by the base station to the first user equipment in a subframe i, a downlink control channel scheduling a physical uplink shared channel; and receiving, by the base station in a subframe i+k1, the physical uplink shared channel scheduled by the downlink control channel, where the physical uplink shared channel scheduled by the downlink control channel is transmitted in the first serving cell, i is a nonnegative integer, k1 is a positive integer, a value of k1 is determined according to timing when an uplink-downlink configuration in a frame structure type 2 is the same as the uplink-downlink configuration of the first serving cell, and the frame structure type 2 is a frame structure type of Long Term Evolution release 8, release 9, release 10, release 11, or release 12.

With reference to the fourth aspect, or the first, the second, the third, or the fourth possible implementation of the fourth aspect, in a seventh possible implementation, the sending or receiving, by the base station in the first serving cell, information to or from the first user equipment based on the frame structure includes: receiving, by the base station in a subframe j, a physical uplink shared channel sent by the first user equipment, where the physical uplink shared channel sent by the first user equipment is transmitted in the first serving cell; and sending, by the base station in a subframe j+k2, a hybrid automatic repeat request acknowledgement corresponding to the physical uplink shared channel, where j is a nonnegative integer, k2 is a positive integer, a value of k2 is determined according to timing when an uplink-downlink configuration in a frame structure type 2 is the same as the uplink-downlink configuration of the first serving cell, and the frame structure type 2 is a frame structure type of Long Term Evolution release 8, release 9, release 10, release 11, or release 12.

With reference to the fourth aspect, or the first, the second, the third, or the fourth possible implementation of the fourth aspect, in an eighth possible implementation, the sending or receiving, by the base station in the first serving cell, information to or from the first user equipment based on the frame structure includes: sending, by the base station in a subframe m, a hybrid automatic repeat request acknowledgement that is sent by the first user equipment and that is corresponding to a physical uplink shared channel; and receiving, by the base station, physical uplink shared channel retransmission in a subframe m+k3, where the physical uplink shared channel retransmission is transmitted in the first serving cell, m is a nonnegative integer, k3 is a positive integer, a value of k3 is determined according to timing when an uplink-downlink configuration in a frame structure type 2 is the same as the uplink-downlink configuration of the first serving cell, and the frame structure type 2 is a frame structure type of Long Term Evolution release 8, release 9, release 10, release 11, or release 12.

With reference to the fourth aspect, or the first, the second, the third, the fourth, the fifth, the sixth, the seventh, or the eighth possible implementation of the fourth aspect, in a ninth possible implementation, the method further includes: determining, by the base station, a frame structure of a second serving cell, where the second serving cell is a serving cell of second user equipment; and sending or receiving, by the base station in the second serving cell, information to or from the second user equipment based on the frame structure of the second serving cell, where the frame structure of the second serving cell is the same as the frame structure type 2 of Long Term Evolution release 8, release 9, release 10, release 11, or release 12, and a frequency resource of the second serving cell is adjacent to or the same as a frequency resource of the first serving cell.

With reference to the ninth possible implementation of the fourth aspect, in a tenth possible implementation, in an eleventh possible implementation, when the uplink-downlink configuration of the first serving cell is the uplink-downlink configuration 0, an uplink-downlink configuration of the second serving cell is an uplink-downlink configuration 1; when the uplink-downlink configuration of the first serving cell is the uplink-downlink configuration 1, an uplink-downlink configuration of the second serving cell is an uplink-downlink configuration 2; when the uplink-downlink configuration of the first serving cell is the uplink-downlink configuration 3, an uplink-downlink configuration of the second serving cell is an uplink-downlink configuration 4; or when the uplink-downlink configuration of the first serving cell is the uplink-downlink configuration 4, an uplink-downlink configuration of the second serving cell is an uplink-downlink configuration 5.

With reference to the ninth or the tenth possible implementation of the fourth aspect, in an eleventh possible implementation, a special subframe configuration in the frame structure of the second serving cell is a special subframe configuration 5 or a special subframe configuration 0.

With reference to the ninth, the tenth, or the eleventh possible implementation of the fourth aspect, in a twelfth possible implementation, 11 symbols are shifted between a subframe of the first serving cell and that of the second serving cell.

With reference to the ninth, the tenth, the eleventh, or the twelfth possible implementation of the fourth aspect, in a thirteenth possible implementation, the sending or receiving, by the base station in the second serving cell, information to or from the second user equipment based on the frame structure of the second serving cell includes: indicating, by the base station, a start symbol of a physical downlink shared channel for the second user equipment, where the start symbol of the physical downlink shared channel is the fourth symbol.

With reference to the ninth, the tenth, the eleventh, the twelfth, or the thirteenth possible implementation of the fourth aspect, in a fourteenth possible implementation, the sending or receiving, by the base station in the second serving cell, information to or from the second user equipment based on the frame structure of the second serving cell includes: indicating, by the base station for the second user equipment, a transmission mode corresponding to a physical downlink shared channel, where the transmission mode is a transmission mode 10.

With reference to the ninth, the tenth, the eleventh, the twelfth, the thirteenth, or the fourteenth possible implementation of the fourth aspect, in a fifteenth possible implementation, the sending or receiving, by the base station in the second serving cell, information to or from the second user equipment based on the frame structure of the second serving cell includes: sending, by base station in a downlink subframe n1, a physical downlink shared channel to the second user equipment in the second serving cell, where a start symbol of the physical downlink shared channel transmission is the fourth symbol in the downlink subframe n1, and n1 is a nonnegative integer.

A fifth aspect provides an information sending and receiving system, including: the foregoing first user equipment, second user equipment, and the foregoing base station, where the second user equipment includes: a third frame determining module, configured to determine a frame structure of a second serving cell; and a third transceiver module, connected to the third frame determining module, and configured to send and receive, in the second serving cell, information based on the frame structure of the second serving cell, where the frame structure of the second serving cell is the same as a frame structure type 2 of Long Term Evolution release 8, release 9, release 10, release 11, or release 12, and a frequency resource of the second serving cell is adjacent to or the same as a frequency resource of a first serving cell.

With reference to the fifth aspect, in a first possible implementation, when an uplink-downlink configuration of the first serving cell is an uplink-downlink configuration 0, an uplink-downlink configuration of the second serving cell is an uplink-downlink configuration 1; when an uplink-downlink configuration of the first serving cell is an uplink-downlink configuration 1, an uplink-downlink configuration of the second serving cell is an uplink-downlink configuration 2; when an uplink-downlink configuration of the first serving cell is an uplink-downlink configuration 3, an uplink-downlink configuration of the second serving cell is an uplink-downlink configuration 4; or when an uplink-downlink configuration of the first serving cell is an uplink-downlink configuration 4, an uplink-downlink configuration of the second serving cell is an uplink-downlink configuration 5.

With reference to the fifth aspect or the first possible implementation of the fifth aspect, in a second possible implementation, a special subframe configuration in the frame structure of the second serving cell is a special subframe configuration 5 or a special subframe configuration 0.

With reference to the fifth aspect, or the first or the second possible implementation of the fifth aspect, in a third possible implementation, 11 symbols are shifted between a subframe of the first serving cell and that of the second serving cell.

With reference to the third possible implementation of the fifth aspect, in a fourth possible implementation, 11 symbols are shifted forward for the subframe of the first serving cell compared with the subframe of the second serving cell.

With reference to the fifth aspect, or the first, the second, the third, or the fourth possible implementation of the fifth aspect, in a fifth possible implementation, the third transceiver module is configured to receive, in a downlink subframe n1, a physical downlink shared channel in the second serving cell, where a start symbol of the physical downlink shared channel transmission is the fourth symbol in the downlink subframe n1, and n1 is a nonnegative integer.

With reference to the fifth aspect, the first, the second, the third, or the fourth possible implementation of the fifth aspect, in a sixth possible implementation, the third transceiver module is configured to receive, in a downlink subframe n2, a physical downlink control channel in the second serving cell, where the physical downlink control channel is carried in the first symbol in the downlink subframe n2, and n2 is a nonnegative integer.

With reference to the sixth possible implementation of the fifth aspect, in a seventh possible implementation, the physical downlink control channel is a physical downlink control channel corresponding to a common search space.

In the present invention, first user equipment determines a frame structure of a first serving cell, and sends and receives, in the first serving cell, information based on the frame structure of the first serving cell. In the frame structure of the first serving cell, one radio frame includes at least one first subframe and at least one second subframe, and both the first subframe and the second subframe include a symbol used for downlink transmission, a guard period, and a symbol used for uplink transmission. In the first subframe, a quantity of symbols used for downlink transmission is greater than a quantity of symbols used for uplink transmission; and in the second subframe, a quantity of symbols used for downlink transmission is less than a quantity of symbols used for uplink transmission. This can ensure that a TDD system has same HARQ-ACK timing for different uplink-downlink configurations and can coexist with an existing TDD system.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
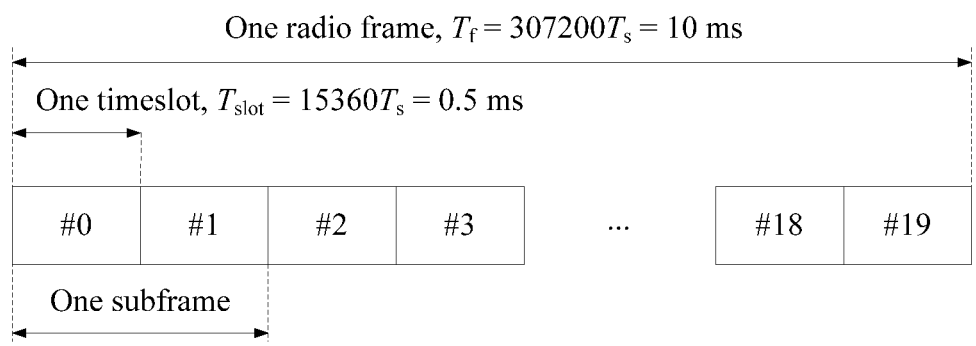
FIG. 1 is a schematic structural diagram of a frame structure type 1 in the prior art.
Figure 2:
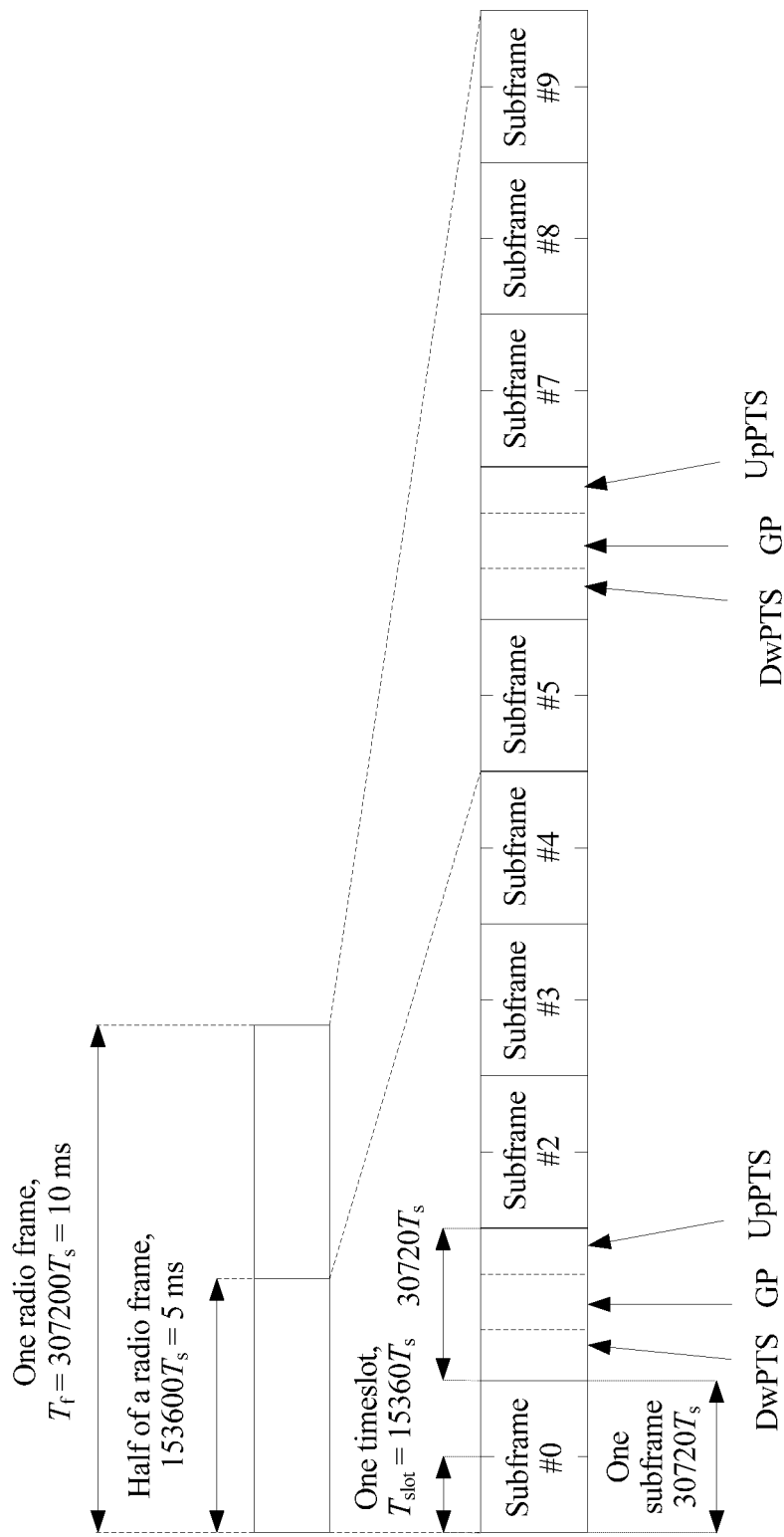
FIG. 2 is a schematic structural diagram of a frame structure type 2 in the prior art.
Figure 3:
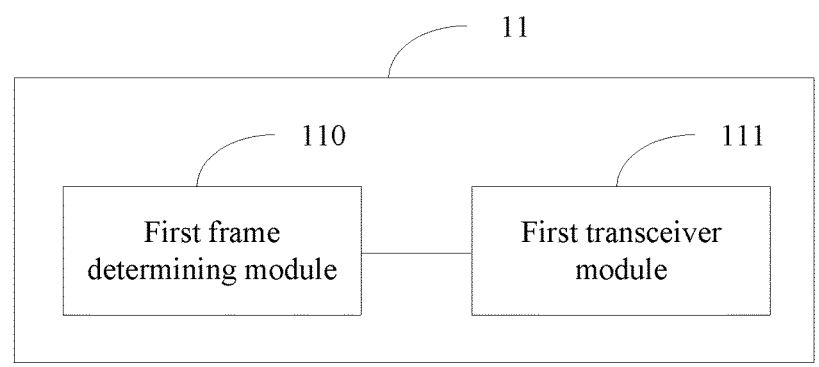
FIG. 3 is a schematic structural diagram of first user equipment according to a first embodiment of the present invention.

Referring to FIG. 3, FIG. 3 is a schematic structural diagram of first user equipment according to a first embodiment of the present invention. As shown in FIG. 3, the first user equipment 11 in this embodiment of the present invention includes a first frame determining module 110 and a first transceiver module 111. The first frame determining module 110 is configured to determine a frame structure of a first serving cell. The first transceiver module 111 is connected to the first frame determining module 110, and is configured to send and receive, in the first serving cell, information based on the frame structure of the first serving cell. In the frame structure of the first serving cell, one radio frame includes at least one first subframe and at least one second subframe. Both the first subframe and the second subframe include a symbol used for downlink transmission, a guard period, and a symbol used for uplink transmission. In the first subframe, a quantity of symbols used for downlink transmission is greater than a quantity of symbols used for uplink transmission; and in the second subframe, a quantity of symbols used for downlink transmission is less than a quantity of symbols used for uplink transmission.

Figure 4:
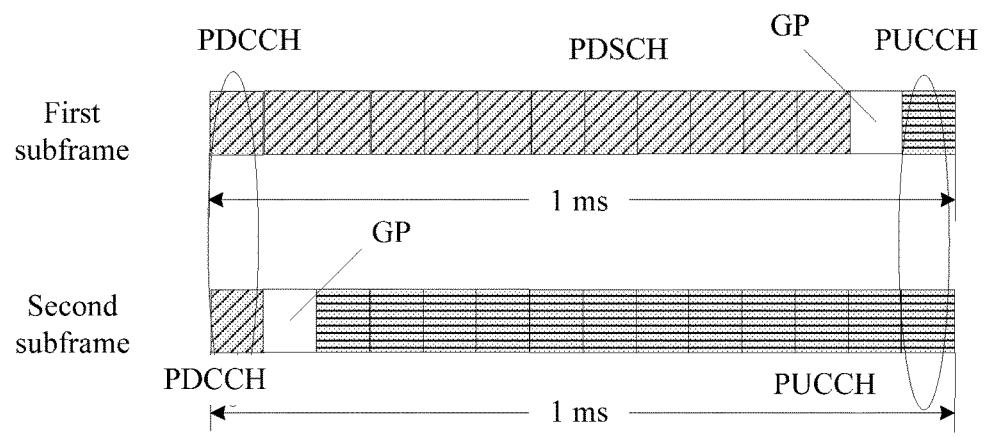
FIG. 4 is a schematic structural diagram of a first subframe and a second subframe according to an embodiment of the present invention.

In this embodiment of the present invention, the first subframe may transmit a physical downlink shared channel PDSCH, and the second subframe may transmit a physical uplink shared channel PUSCH. As shown in FIG. 4, in the frame structure of the first serving cell, each subframe is a 1 ms subframe, the first subframe includes 12 symbols used for downlink transmission, a guard period with duration of one symbol, and one symbol used for uplink transmission, and the second subframe includes one symbol used for downlink transmission, a guard period with duration of one symbol, and 12 symbols used for uplink transmission. A symbol herein may be an orthogonal frequency division multiplexing (OFDM) symbol for the symbol used for downlink transmission, and may be a single-carrier orthogonal frequency division multiplexing (SC-OFDM) symbol for the symbol used for uplink transmission. This embodiment of the present invention imposes no limitation on a length of each subframe in the frame structure of the first serving cell, which is preferentially 1 ms. It should be noted that the first subframe and the second subframe in all embodiments of the present invention may belong to special subframes, but actual subframe structures of the special subframes are inconsistent with a subframe structure of a special subframe of existing LTE release 8, release 9, release 10, release 11, or release 12. Therefore, the first subframe may also be referred to as a first special subframe, and the second subframe may also be referred to as a second special subframe. In the first subframe, the symbol used for uplink transmission may be used to transmit only a physical uplink control channel and/or a sounding reference signal. In the second subframe, the symbol used for downlink transmission may be used to transmit only a physical downlink control channel and/or a downlink reference signal.

In the frame structure of the first serving cell, if a subframe l is the first subframe or a downlink subframe, a subframe l+k is the first subframe, the second subframe, or an uplink subframe. l is a nonnegative integer, and k is a positive integer greater than 1. Therefore, an HARQ-ACK corresponding to the subframe l can be fed back in the subframe l+k, and for different uplink-downlink configurations, the frame structure of the first serving cell has same uplink HARQ-ACK timing. This embodiment of the present invention imposes no limitation on a value of k, and when the length of each subframe in the frame structure of the first serving cell is 1 ms, a value of k is preferentially 4. It should be noted that l and l+k are subframe numbers.

In this embodiment and the following embodiments of the present invention, a subframe number is a serial number of a subframe among multiple radio frames, and may be obtained in the following manner: Subframes among the multiple radio frames are numbered from 0 according to a time sequence in a monotonically increasing manner. That is, if the last subframe of a radio frame is numbered n', the first subframe of a next radio frame is numbered n'+1. In addition, among the multiple radio frames, each subframe also has a subframe sequence number in a radio frame in which the subframe is located, that is, a subframe sequence number of the subframe in the radio frame. For example, a subframe n is a subframe 2 in a radio frame. This means that a subframe sequence number of the subframe n is 2 in the radio frame in which the subframe n is located, or that the subframe n is the third subframe in the radio frame in which the subframe n is located, or that the subframe n is corresponding to the third subframe in each radio frame, or that the subframe n is corresponding to the subframe 2 in each radio frame.

In this embodiment of the present invention, an uplink-downlink configuration of the first serving cell may be an uplink-downlink configuration a, an uplink-downlink configuration b, an uplink-downlink configuration c, or an uplink-downlink configuration d. That is, the uplink-downlink configuration of the first serving cell may be one of the uplink-downlink configuration a, the uplink-downlink configuration b, the uplink-downlink configuration c, or the uplink-downlink configuration d, or may be converted among these uplink-downlink configurations by using higher layer signaling. a, b, c, and d may be indexes of the uplink-downlink configurations. For example, values may be respectively 0, 1, 3, and 4. It should be noted that, in all the embodiments of the present invention, when values of a, b, c, and d may be respectively 0, 1, 3, and 4, this does not mean that the frame structure of the first serving cell is a frame structure corresponding to an uplink-downlink configuration 0, an uplink-downlink configuration 1, an uplink-downlink configuration 3, or an uplink-downlink configuration 4 in Table 2, but means that in one frame, a ratio of a quantity of subframes that may be used to transmit a physical downlink shared channel to a quantity of subframes that may be used to transmit a physical uplink shared channel is the same as that in Table 2. For example, the uplink-downlink configuration 0 indicates that in one frame, a ratio of a quantity of subframes that may be used to transmit a physical downlink shared channel to a quantity of subframes that may be used to transmit a physical uplink shared channel is 2:3; the uplink-downlink configuration 1 indicates that in one frame, a ratio of a quantity of subframes that may be used to transmit a physical downlink shared channel to a quantity of subframes that may be used to transmit a physical uplink shared channel is 3:2; the uplink-downlink configuration 3 indicates that in one frame, a ratio of a quantity of subframes that may be used to transmit a physical downlink shared channel to a quantity of subframes that may be used to transmit a physical uplink shared channel is 7:3; the uplink-downlink configuration 4 indicates that in one frame, a ratio of a quantity of subframes that may be used to transmit a physical downlink shared channel to a quantity of subframes that may be used to transmit a physical uplink shared channel is 8:2.

TABLE 2

Uplink-downlink configuration for TDD

| Uplink-downlink configuration | Periodic downlink-to-uplink switch point | Subframe | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Optionally, determining, by the first frame determining module 110, the frame structure of the first serving cell may be determining, by the first frame determining module 110, the frame structure of the first serving cell according to the uplink-downlink configuration of the first serving cell, and may be specifically as follows:

When the uplink-downlink configuration of the first serving cell is the uplink-downlink configuration a, the radio frame includes 10 subframes, where a subframe 0 and a subframe 5 are the first subframes, a subframe 1 and a subframe 6 are either downlink subframes or the first subframes, a subframe 2 and a subframe 7 are the second subframes, and a subframe 3, a subframe 4, a subframe 8, and a subframe 9 are uplink subframes;

when the uplink-downlink configuration of the first serving cell is the uplink-downlink configuration b, the radio frame includes 10 subframes, where a subframe 0, a subframe 4, a subframe 5, and a subframe 9 are the first subframes, a subframe 1 and a subframe 6 are either downlink subframes or the first subframes, a subframe 2 and a subframe 7 are the second subframes, and a subframe 3 and a subframe 8 are uplink subframes;

when the uplink-downlink configuration of the first serving cell is the uplink-downlink configuration c, the radio frame includes 10 subframes, where a subframe 0, a subframe 1, a subframe 5, and a subframe 9 are the first subframes, a subframe 6, a subframe 7, and a subframe 8 are either downlink subframes or the first subframes, a subframe 2 is the second subframe, and a subframe 3 and a subframe 4 are uplink subframes; or when the uplink-downlink configuration of the first serving cell is the uplink-downlink configuration d, the radio frame includes 10 subframes, where a subframe 0, a subframe 1, a subframe 4, a subframe 5, a subframe 8, and a subframe 9 are the first subframes, a subframe 6 and a subframe 7 are either downlink subframes or the first subframes, a subframe 2 is the second subframe, and a subframe 3 is an uplink subframe.

Further, optionally, determining, by the first frame determining module 110, the frame structure of the first serving cell may be determining the frame structure of the first serving cell according to the uplink-downlink configuration of the first serving cell and Table 3, or may be determining the frame structure of the first serving cell according to the uplink-downlink configuration of the first serving cell and Table 4. In Table 3 and Table 4, D represents a downlink subframe, U represents an uplink subframe, S1 represents a first subframe, and S2 represents a second subframe.

TABLE 3

Example 1 of the uplink-downlink configuration of the first serving cell

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| a | S1 | D | S2 | U | U | S1 | D | S2 | U | U |
| b | S1 | D | S2 | U | S1 | S1 | D | S2 | U | S1 |
| c | S1 | S1 | S2 | U | U | S1 | D | D | D | S1 |
| d | S1 | S1 | S2 | U | S1 | S1 | D | D | S1 | S1 |

TABLE 4

Example 2 of the uplink-downlink configuration of the first serving cell

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| a | S1 | S1 | S2 | U | U | S1 | S1 | S2 | U | U |
| b | S1 | S1 | S2 | U | S1 | S1 | S1 | S2 | U | S1 |
| c | S1 | S1 | S2 | U | U | S1 | S1 | S1 | S1 | S1 |
| d | S1 | S1 | S2 | U | S1 | S1 | S1 | S1 | S1 | S1 |

It should be noted that the present invention imposes no limitation on the uplink-downlink configuration of the first serving cell. That is, the uplink-downlink configuration of the first serving cell is not limited to that in Table 3. However, when the frame structure of the first serving cell needs to coexist with a frame structure type 2 of an existing LTE system, the uplink-downlink configuration of the first serving cell is preferentially the uplink-downlink configuration 0, the uplink-downlink configuration 1, the uplink-downlink configuration 3, or the uplink-downlink configuration 4.

Compared with Table 4, in Table 3, some first subframes are converted into downlink subframes. This ensures that the frame structure of the first serving cell can coexist with an existing LTE frame structure 2, and reduces GP overheads.

In all the embodiments of the present invention, the first serving cell corresponding to the first user equipment 11 may be a serving cell configured by a network side device for the first user equipment 11, a serving cell that serves the first user equipment 11, or a serving cell accessed by the first user equipment 11. A serving cell in this embodiment of the present invention may also be referred to as a component carrier. In this embodiment of the present invention, the first serving cell may be a primary serving cell or a secondary serving cell of the first user equipment 11.

In this embodiment of the present invention, sending and receiving, by the first transceiver module 111 in the first serving cell, the information based on the frame structure of the first serving cell may be performed according to the following uplink HARQ timing:

The first transceiver module 111 receives, in a subframe n−k, a physical downlink shared channel PDSCH or a downlink control channel that indicates downlink semi-persistent scheduling SPS release. The physical downlink shared channel or the downlink control channel that indicates the downlink semi-persistent scheduling release is transmitted in the first serving cell, and n is a nonnegative integer. The first transceiver module 111 sends, in a subframe n, a hybrid automatic repeat request acknowledgement HARQ-ACK corresponding to the physical downlink shared channel or the downlink control channel in a subframe n−4. The hybrid automatic repeat request acknowledgement corresponding to the physical downlink shared channel or the downlink control channel is transmitted in the first serving cell. It should be noted that n and n−4 are subframe numbers, and the subframe n−4 indicates a subframe obtained by shifting the subframe n forward by 4 numeral positions.

Sending and receiving, by the first transceiver module 111 in the first serving cell, the information based on the frame structure of the first serving cell may be performed according to the following downlink HARQ timing:

The first transceiver module 111 receives, in a subframe i, a downlink control channel scheduling a physical uplink shared channel. The first transceiver module 111 sends, in a subframe i+k1, the physical uplink shared channel scheduled by the downlink control channel. The physical uplink shared channel scheduled by the downlink control channel is transmitted in the first serving cell, i is a nonnegative integer, k1 is a positive integer, a value of k1 is determined according to timing when an uplink-downlink configuration in a frame structure type 2 is the same as the uplink-downlink configuration of the first serving cell, and the frame structure type 2 is a frame structure type of Long Term Evolution release 8, release 9, release 10, release 11, or release 12. It should be noted that i and i+k1 are subframe numbers, and the subframe i+k1 indicates a subframe obtained by shifting the subframe i backward by k1 numeral positions. For example, if the uplink-downlink configuration of the first serving cell is the uplink-downlink configuration 0, a value of k1 is the same as that for an uplink-downlink configuration 0 in the frame structure type 2 of LTE release 8, release 9, release 10, release 11, or release 12. For example, if a value of k1 is the same as that for the uplink-downlink configuration in the frame structure type 2 of LTE release 8 when the uplink-downlink configuration in the frame structure type 2 of LTE release 8 is the same as the uplink-downlink configuration of the first serving cell, the value of k1 is shown in Table 5.

Alternatively, sending and receiving, by the first transceiver module 111 in the first serving cell, the information based on the frame structure of the first serving cell may be performed according to the following downlink HARQ timing:

The first transceiver module 111 sends a physical uplink shared channel in a subframe j. The physical uplink shared channel is transmitted in the first serving cell. The first transceiver module 111 receives, in a subframe j+k2, an HARQ-ACK corresponding to the physical uplink shared channel. j is a nonnegative integer, k2 is a positive integer, a value of k2 is determined according to timing when an uplink-downlink configuration in a frame structure type 2 is the same as the uplink-downlink configuration of the first serving cell, and the frame structure type 2 is a frame structure type of Long Term Evolution release 8, release 9, release 10, release 11, or release 12. It should be noted that j and j+k2 are subframe numbers, and the subframe j+k2 indicates a subframe obtained by shifting the subframe j backward by k2 numeral positions. For example, if the uplink-downlink configuration of the first serving cell is the uplink-downlink configuration 0, a value of k2 is the same as that for an uplink-downlink configuration 0 in the frame structure type 2 of LTE release 8, release 9, release 10, release 11, or release 12. For example, if a value of k2 is the same as that for the uplink-downlink configuration in the frame structure type 2 of LTE release 8 when the uplink-downlink configuration in the frame structure type 2 of LTE release 8 is the same as the uplink-downlink configuration of the first serving cell, the value of k2 is shown in Table 6.

Alternatively, sending and receiving, by the first transceiver module 111 in the first serving cell, the information based on the frame structure of the first serving cell may be performed according to the following downlink HARQ timing:

The first transceiver module 111 receives, in a subframe m, an HARQ-ACK corresponding to a physical uplink shared channel. The first transceiver module 111 sends, in a subframe m+k3, the physical uplink shared channel corresponding to the HARQ-ACK. m is a nonnegative integer, k3 is a positive integer, a value of k3 is determined according to timing when an uplink-downlink configuration in a frame structure type 2 is the same as the uplink-downlink configuration of the first serving cell, and the frame structure type 2 is a frame structure type of Long Term Evolution release 8, release 9, release 10, release 11, or release 12. It should be noted that m and m+k3 are subframe numbers, and the subframe m+k3 indicates a subframe obtained by shifting the subframe m backward by k3 numeral positions. For example, if the uplink-downlink configuration of the first serving cell is the uplink-downlink configuration 0, a value of k3 is the same as that for an uplink-downlink configuration 0 in the frame structure type 2 of LTE release 8, release 9, release 10, release 11, or release 12. For example, if a value of k3 is the same as that for the uplink-downlink configuration in the frame structure type 2 of LTE release 8 when the uplink-downlink configuration in the frame structure type 2 of LTE release 8 is the same as the uplink-downlink configuration of the first serving cell, the value of k3 is shown in Table 5.

TABLE 5

Values of k1 or k3 for different uplink-downlink configurations

| Uplink-downlink configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

TABLE 6

Values of k2 for different uplink-downlink configurations

| Uplink-downlink configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | | | | 4 | 7 | 6 | | 4 | 7 | 6 |
| 1 | | | | 4 | 6 | | | 4 | 6 | |
| 2 | | | | 6 | | | | | 6 | |
| 3 | | | | 6 | 6 | 6 | | | | |
| 4 | | | | 6 | 6 | | | | | |
| 5 | | | | 6 | | | | | | |
| 6 | | | | 4 | 6 | 6 | | | 4 | 7 |

When the first transceiver module 111 sends and receives, in the first serving cell, the information based on the frame structure of the first serving cell, uplink HARQ timing remains unchanged for different uplink-downlink configurations, and downlink HARQ timing is consistent with that of the existing LTE system. Therefore, implementation complexity and protocol complexity can be reduced. In addition, the uplink HARQ timing ensures that an HARQ-ACK of only one downlink subframe or first subframe needs to be fed back in one uplink subframe or second subframe. Therefore, compared with the existing LTE system in which HARQ-ACKs of multiple downlink subframes need to be fed back in one uplink subframe, a feedback volume is reduced, and HARQ-ACK performance is improved.

Figure 5:
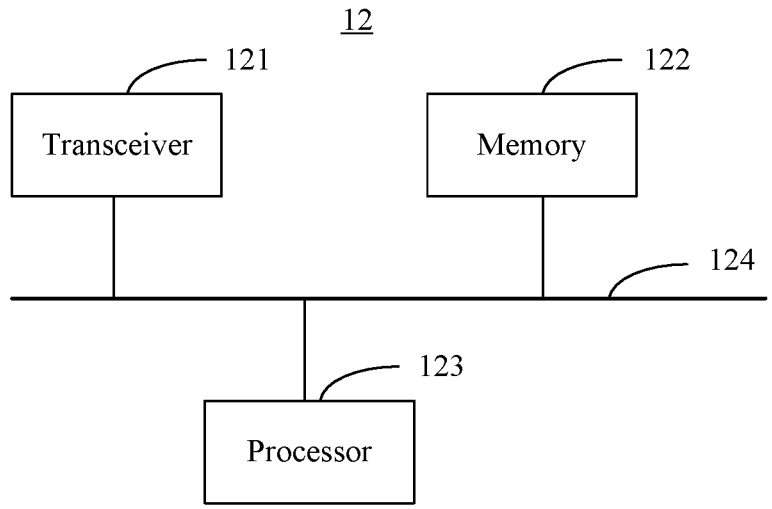
FIG. 5 is a schematic structural diagram of first user equipment according to a second embodiment of the present invention.

FIG. 5 is a schematic structural diagram of first user equipment according to a second embodiment of the present invention. As shown in FIG. 5, the first user equipment 12 includes a transceiver 121, a memory 122, a processor 123, and a data bus 124. The transceiver 121, the memory 122, and the processor 123 are connected by using the data bus 124, so as to communicate with each other.

In this embodiment of the present invention, the processor 123 determines a frame structure of a first serving cell. The processor 123 may determine the frame structure of the first serving cell according to an uplink-downlink configuration of the first serving cell. Different uplink-downlink configurations are corresponding to different frame structures, and different frame structures are corresponding to different frame compositions. In the frame structure of the first serving cell, one radio frame includes at least one first subframe and at least one second subframe. Both the first subframe and the second subframe include a symbol used for downlink transmission, a guard period, and a symbol used for uplink transmission. In the first subframe, a quantity of symbols used for downlink transmission is greater than a quantity of symbols used for uplink transmission; and in the second subframe, a quantity of symbols used for downlink transmission is less than a quantity of symbols used for uplink transmission. The memory 122 is configured to store the frame structure of the first serving cell.

The first subframe may transmit a physical downlink shared channel PDSCH, and the second subframe may transmit a physical uplink shared channel PUSCH. Further, if a subframe l is the first subframe or a downlink subframe, a subframe l+k is the first subframe, the second subframe, or an uplink subframe. l is a nonnegative integer, and k is a positive integer greater than 1. Therefore, an HARQ-ACK corresponding to the subframe l can be fed back in the subframe l+k, and for different uplink-downlink configurations, the frame structure of the first serving cell has same uplink HARQ-ACK timing. It should be noted that l and l+k are subframe numbers. This embodiment of the present invention imposes no limitation on a value of k; and when a length of each subframe in the frame structure of the first serving cell is 1 ms, a value of k is preferentially 4.

In the frame structure of the first serving cell, as shown in FIG. 4, the first subframe includes 12 symbols used for downlink transmission, a guard period GP with duration of one symbol, and one symbol used for uplink transmission; and the second subframe includes one symbol used for downlink transmission, a guard period GP with duration of one symbol, and 12 symbols used for uplink transmission. A symbol herein may be an OFDM symbol for the symbol used for downlink transmission, and may be an SC-FDMA symbol for the symbol used for uplink transmission. This embodiment of the present invention imposes no limitation on the length of each subframe in the frame structure of the first serving cell, which is preferentially 1 ms. It should be noted that the first subframe and the second subframe in all embodiments of the present invention may belong to special subframes, but actual subframe structures of the special subframes are inconsistent with a subframe structure of a special subframe of existing LTE release 8, release 9, release 10, release 11, or release 12. Therefore, the first subframe may also be referred to as a first special subframe, and the second subframe may also be referred to as a second special subframe. In the first subframe, the symbol used for uplink transmission may be used to transmit only a physical uplink control channel and/or a sounding reference signal (SRS). In the second subframe, the symbol used for downlink transmission may be used to transmit only a physical downlink control channel and/or a downlink reference signal.

In this embodiment of the present invention, the uplink-downlink configuration of the first serving cell may be an uplink-downlink configuration a, an uplink-downlink configuration b, an uplink-downlink configuration c, or an uplink-downlink configuration d. That is, the uplink-downlink configuration of the first serving cell may be one of the uplink-downlink configuration a, the uplink-downlink configuration b, the uplink-downlink configuration c, or the uplink-downlink configuration d, or may be converted among these uplink-downlink configurations by using higher layer signaling. a, b, c, and d may be indexes of the uplink-downlink configurations. For example, values may be respectively 0, 1, 3, and 4. It should be noted that, in all the embodiments of the present invention, when values of a, b, c, and d may be respectively 0, 1, 3, and 4, this does not mean that the frame structure of the first serving cell is a frame structure corresponding to an uplink-downlink configuration 0, an uplink-downlink configuration 1, an uplink-downlink configuration 3, or an uplink-downlink configuration 4 in Table 2, but means that in one frame, a ratio of a quantity of subframes that may be used to transmit a physical downlink shared channel to a quantity of subframes that may be used to transmit a physical uplink shared channel is the same as that in Table 2. For example, the uplink-downlink configuration 0 indicates that in one frame, a ratio of a quantity of subframes that may be used to transmit a physical downlink shared channel to a quantity of subframes that may be used to transmit a physical uplink shared channel is 2:3; the uplink-downlink configuration 1 indicates that in one frame, a ratio of a quantity of subframes that may be used to transmit a physical downlink shared channel to a quantity of subframes that may be used to transmit a physical uplink shared channel is 3:2; the uplink-downlink configuration 3 indicates that in one frame, a ratio of a quantity of subframes that may be used to transmit a physical downlink shared channel to a quantity of subframes that may be used to transmit a physical uplink shared channel is 7:3; the uplink-downlink configuration 4 indicates that in one frame, a ratio of a quantity of subframes that may be used to transmit a physical downlink shared channel to a quantity of subframes that may be used to transmit a physical uplink shared channel is 8:2.

Optionally, determining, by the processor 123, the frame structure of the first serving cell may be determining the frame structure of the first serving cell for the first user equipment 12 according to the uplink-downlink configuration of the first serving cell, and may be specifically as follows:

When the uplink-downlink configuration of the first serving cell is the uplink-downlink configuration a, the radio frame includes 10 subframes, where a subframe 0 and a subframe 5 are the first subframes, a subframe 1 and a subframe 6 are either downlink subframes or the first subframes, a subframe 2 and a subframe 7 are the second subframes, and a subframe 3, a subframe 4, a subframe 8, and a subframe 9 are uplink subframes;

when the uplink-downlink configuration of the first serving cell is the uplink-downlink configuration b, the radio frame includes 10 subframes, where a subframe 0, a subframe 4, a subframe 5, and a subframe 9 are the first subframes, a subframe 1 and a subframe 6 are either downlink subframes or the first subframes, a subframe 2 and a subframe 7 are the second subframes, and a subframe 3 and a subframe 8 are uplink subframes;

when the uplink-downlink configuration of the first serving cell is the uplink-downlink configuration c, the radio frame includes 10 subframes, where a subframe 0, a subframe 1, a subframe 5, and a subframe 9 are the first subframes, a subframe 6, a subframe 7, and a subframe 8 are either downlink subframes or the first subframes, a subframe 2 is the second subframe, and a subframe 3 and a subframe 4 are uplink subframes; or when the uplink-downlink configuration of the first serving cell is the uplink-downlink configuration d, the radio frame includes 10 subframes, where a subframe 0, a subframe 1, a subframe 4, a subframe 5, a subframe 8, and a subframe 9 are the first subframes, a subframe 6 and a subframe 7 are either downlink subframes or the first subframes, a subframe 2 is the second subframe, and a subframe 3 is an uplink subframe.

Further, optionally, determining, by the processor 123, the frame structure of the first serving cell may be determining the frame structure of the first serving cell according to the uplink-downlink configuration of the first serving cell and Table 3, or may be determining the frame structure of the first serving cell according to the uplink-downlink configuration of the first serving cell and Table 4. For other descriptions of Table 3 and Table 4, refer to the first embodiment. Details are not described herein again.

It should be noted that the present invention imposes no limitation on the uplink-downlink configuration of the first serving cell. That is, the uplink-downlink configuration of the first serving cell is not limited to that in Table 3. However, when the frame structure of the first serving cell needs to coexist with a frame structure type 2 of an existing LTE system, the uplink-downlink configuration of the first serving cell is preferentially the uplink-downlink configuration 0, the uplink-downlink configuration 1, the uplink-downlink configuration 3, or the uplink-downlink configuration 4.

Compared with Table 4, in Table 3, some first subframes are converted into downlink subframes. This ensures that the frame structure of the first serving cell can coexist with an existing LTE frame structure 2, and reduces GP overheads.

In all the embodiments of the present invention, the first serving cell corresponding to the first user equipment 12 may be a serving cell configured by a network side device for the first user equipment 12, a serving cell that serves the first user equipment 12, or a serving cell accessed by the first user equipment 12. A serving cell in this embodiment of the present invention may also be referred to as a component carrier. In this embodiment of the present invention, the first serving cell may be a primary serving cell or a secondary serving cell of the first user equipment 12.

In this embodiment of the present invention, sending and receiving, by the transceiver 121 in the first serving cell, information based on the frame structure of the first serving cell may be performed according to the following uplink HARQ timing:

The transceiver 121 receives, in a subframe n−k, physical downlink shared channel PDSCH transmission or a downlink control channel that indicates downlink semi-persistent scheduling SPS release. The physical downlink shared channel or the downlink control channel that indicates the downlink semi-persistent scheduling release is transmitted in the first serving cell, and n is a nonnegative integer. The transceiver 121 sends, in a subframe n, an HARQ-ACK corresponding to the physical downlink shared channel or the downlink control channel in a subframe n−4. The HARQ-ACK corresponding to the physical downlink shared channel or the downlink control channel is transmitted in the first serving cell. It should be noted that n and n−4 are subframe numbers.

Sending and receiving, by the transceiver 121 in the first serving cell, the information based on the frame structure of the first serving cell may be performed according to the following downlink HARQ timing:

The transceiver 121 receives, in a subframe i, a downlink control channel scheduling a physical uplink shared channel. The transceiver 121 sends, in a subframe i+k1, the physical uplink shared channel scheduled by the downlink control channel. The physical uplink shared channel scheduled by the downlink control channel is transmitted in the first serving cell, i is a nonnegative integer, k1 is a positive integer, a value of k1 is determined according to timing when an uplink-downlink configuration in a frame structure type 2 is the same as the uplink-downlink configuration of the first serving cell, and the frame structure type 2 is a frame structure type of Long Term Evolution release 8, release 9, release 10, release 11, or release 12. For example, if the uplink-downlink configuration of the first serving cell is the uplink-downlink configuration 0, a value of k1 is the same as that for an uplink-downlink configuration 0 in the frame structure type 2 of LTE release 8, release 9, release 10, release 11, or release 12. For example, if a value of k1 is the same as that for the uplink-downlink configuration in the frame structure type 2 of LTE release 8 when the uplink-downlink configuration in the frame structure type 2 of LTE release 8 is the same as the uplink-downlink configuration of the first serving cell, the value of k1 is shown in Table 5. It should be noted that i and i+k1 are subframe numbers.

Alternatively, sending and receiving, by the transceiver 121 in the first serving cell, the information based on the frame structure of the first serving cell may be performed according to the following downlink HARQ timing:

The transceiver 121 sends a physical uplink shared channel in a subframe j. The physical uplink shared channel is transmitted in the first serving cell. The transceiver 121 receives, in a subframe j+k2, an HARQ-ACK corresponding to the physical uplink shared channel. j is a nonnegative integer, k2 is a positive integer, a value of k2 is determined according to timing when an uplink-downlink configuration in a frame structure type 2 is the same as the uplink-downlink configuration of the first serving cell, and the frame structure type 2 is a frame structure type of Long Term Evolution release 8, release 9, release 10, release 11, or release 12. For example, if the uplink-downlink configuration of the first serving cell is the uplink-downlink configuration 0, a value of k2 is the same as that for an uplink-downlink configuration 0 in the frame structure type 2 of LTE release 8, release 9, release 10, release 11, or release 12. For example, if a value of k2 is the same as that for the uplink-downlink configuration in the frame structure type 2 of LTE release 8 when the uplink-downlink configuration in the frame structure type 2 of LTE release 8 is the same as the uplink-downlink configuration of the first serving cell, the value of k2 is shown in Table 6. It should be noted that j and j+k2 are subframe numbers.

Alternatively, sending and receiving, by the transceiver 121 in the first serving cell, the information based on the frame structure of the first serving cell may be performed according to the following downlink HARQ timing:

The transceiver 121 receives, in a subframe m, an HARQ-ACK corresponding to a physical uplink shared channel. The transceiver 121 sends, in a subframe m+k3, the physical uplink shared channel corresponding to the HARQ-ACK. The physical uplink shared channel corresponding to the HARQ-ACK is transmitted in the first serving cell, m is a nonnegative integer, k3 is a positive integer, a value of k3 is determined according to timing when an uplink-downlink configuration in a frame structure type 2 is the same as the uplink-downlink configuration of the first serving cell, and the frame structure type 2 is a frame structure type of Long Term Evolution release 8, release 9, release 10, release 11, or release 12. For example, if the uplink-downlink configuration of the first serving cell is the uplink-downlink configuration 0, a value of k3 is the same as that for an uplink-downlink configuration 0 in the frame structure type 2 of LTE release 8, release 9, release 10, release 11, or release 12. For example, if a value of k3 is the same as that for the uplink-downlink configuration in the frame structure type 2 of LTE release 8 when the uplink-downlink configuration in the frame structure type 2 of LTE release 8 is the same as the uplink-downlink configuration of the first serving cell, the value of k3 is shown in Table 5. It should be noted that m and m+k3 are subframe numbers.

In this embodiment of the present invention, when the transceiver 121 sends and receives, in the first serving cell, the information based on the frame structure of the first serving cell, uplink HARQ timing remains unchanged for different uplink-downlink configurations, and downlink HARQ timing is consistent with that of the existing LTE system. Therefore, implementation complexity and protocol complexity can be reduced. In addition, the uplink HARQ timing ensures that an HARQ-ACK of only one downlink subframe or first subframe needs to be fed back in one uplink subframe or second subframe. Therefore, compared with the existing LTE system in which HARQ-ACKs of multiple downlink subframes need to be fed back in one uplink subframe, a feedback volume is reduced, and HARQ-ACK performance is improved.

Figure 6:
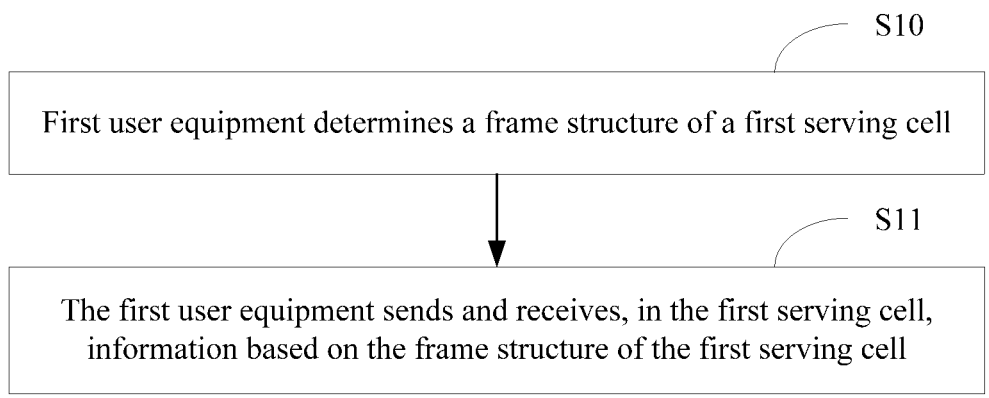
FIG. 6 is a schematic flowchart of an information sending and receiving method according to a first embodiment of the present invention.

FIG. 6 is a schematic flowchart of an information sending and receiving method according to a first embodiment of the present invention. As shown in FIG. 6, the information sending and receiving method in this embodiment of the present invention includes the following steps.

S10. First user equipment determines a frame structure of a first serving cell.

Specifically, the first user equipment may determine the frame structure of the first serving cell according to an uplink-downlink configuration of the first serving cell. Different uplink-downlink configurations are corresponding to different frame structures, and different frame structures are corresponding to different frame compositions. In the frame structure of the first serving cell, one radio frame includes at least one first subframe and at least one second subframe. Both the first subframe and the second subframe include a symbol used for downlink transmission, a guard period, and a symbol used for uplink transmission. In the first subframe, a quantity of symbols used for downlink transmission is greater than a quantity of symbols used for uplink transmission; and in the second subframe, a quantity of symbols used for downlink transmission is less than a quantity of symbols used for uplink transmission.

The first subframe may transmit a physical downlink shared channel PDSCH, and the second subframe may transmit a physical uplink shared channel PUSCH. Further, if a subframe l is the first subframe or a downlink subframe, a subframe l+k is the first subframe, the second subframe, or an uplink subframe. l is a nonnegative integer, and k is a positive integer greater than 1. Therefore, an HARQ-ACK corresponding to the subframe l can be fed back in the subframe l+k, and for different uplink-downlink configurations, the frame structure of the first serving cell has same uplink HARQ-ACK timing. This embodiment of the present invention imposes no limitation on a value of k; and when a length of each subframe in the frame structure of the first serving cell is 1 ms, a value of k is preferentially 4. It should be noted that l and l+k are subframe numbers.

In a more specific embodiment, FIG. 4 shows subframe structures of the first subframe and the second subframe that have a subframe length of 1 ms. A PDCCH is a physical downlink control channel; a PDSCH is a physical downlink shared channel, and indicates a downlink transmission channel; a PUSCH is a physical uplink shared channel; and a PUCCH is a physical uplink control channel. As shown in FIG. 4, in the frame structure of the first serving cell, the first subframe includes 12 symbols used for downlink transmission, a guard period GP with duration of one symbol, and one symbol used for uplink transmission; and the second subframe includes one symbol used for downlink transmission, a guard period GP with duration of one symbol, and 12 symbols used for uplink transmission. A symbol herein may be an OFDM symbol for the symbol used for downlink transmission, and may be an SC-OFDM symbol for the symbol used for uplink transmission. This embodiment of the present invention imposes no limitation on the length of each subframe in the frame structure of the first serving cell, which is preferentially 1 ms. It should be noted that the first subframe and the second subframe in all embodiments of the present invention may belong to special subframes, but actual subframe structures of the special subframes are inconsistent with a subframe structure of a special subframe of existing LTE release 8, release 9, release 10, release 11, or release 12. Therefore, the first subframe may also be referred to as a first special subframe, and the second subframe may also be referred to as a second special subframe. In the first subframe, the symbol used for uplink transmission may be used to transmit only a physical uplink control channel and/or a sounding reference signal. In the second subframe, the symbol used for downlink transmission may be used to transmit only a physical downlink control channel and/or a downlink reference signal.

In this embodiment of the present invention, the uplink-downlink configuration of the first serving cell may be an uplink-downlink configuration a, an uplink-downlink configuration b, an uplink-downlink configuration c, or an uplink-downlink configuration d. That is, the uplink-downlink configuration of the first serving cell may be one of the uplink-downlink configuration a, the uplink-downlink configuration b, the uplink-downlink configuration c, or the uplink-downlink configuration d, or may be converted among these uplink-downlink configurations by using higher layer signaling. a, b, c, and d may be indexes of the uplink-downlink configurations. For example, values may be respectively 0, 1, 3, and 4. It should be noted that, in all the embodiments of the present invention, when values of a, b, c, and d may be respectively 0, 1, 3, and 4, this does not mean that the frame structure of the first serving cell is a frame structure corresponding to an uplink-downlink configuration 0, an uplink-downlink configuration 1, an uplink-downlink configuration 3, or an uplink-downlink configuration 4 in Table 2, but means that in one frame, a ratio of a quantity of subframes that may be used to transmit a physical downlink shared channel to a quantity of subframes that may be used to transmit a physical uplink shared channel is the same as that in Table 2. For example, the uplink-downlink configuration 0 indicates that in one frame, a ratio of a quantity of subframes that may be used to transmit a physical downlink shared channel to a quantity of subframes that may be used to transmit a physical uplink shared channel is 2:3; the uplink-downlink configuration 1 indicates that in one frame, a ratio of a quantity of subframes that may be used to transmit a physical downlink shared channel to a quantity of subframes that may be used to transmit a physical uplink shared channel is 3:2; the uplink-downlink configuration 3 indicates that in one frame, a ratio of a quantity of subframes that may be used to transmit a physical downlink shared channel to a quantity of subframes that may be used to transmit a physical uplink shared channel is 7:3; the uplink-downlink configuration 4 indicates that in one frame, a ratio of a quantity of subframes that may be used to transmit a physical downlink shared channel to a quantity of subframes that may be used to transmit a physical uplink shared channel is 8:2.

Optionally, determining, by the first user equipment, the frame structure of the first serving cell may be determining, by the first user equipment, the frame structure of the first serving cell according to the uplink-downlink configuration of the first serving cell, and may be specifically as follows:

When the uplink-downlink configuration of the first serving cell is the uplink-downlink configuration a, the radio frame includes 10 subframes, where a subframe 0 and a subframe 5 are the first subframes, a subframe 1 and a subframe 6 are either downlink subframes or the first subframes, a subframe 2 and a subframe 7 are the second subframes, and a subframe 3, a subframe 4, a subframe 8, and a subframe 9 are uplink subframes;

when the uplink-downlink configuration of the first serving cell is the uplink-downlink configuration b, the radio frame includes 10 subframes, where a subframe 0, a subframe 4, a subframe 5, and a subframe 9 are the first subframes, a subframe 1 and a subframe 6 are either downlink subframes or the first subframes, a subframe 2 and a subframe 7 are the second subframes, and a subframe 3 and a subframe 8 are uplink subframes;

when the uplink-downlink configuration of the first serving cell is the uplink-downlink configuration c, the radio frame includes 10 subframes, where a subframe 0, a subframe 1, a subframe 5, and a subframe 9 are the first subframes, a subframe 6, a subframe 7, and a subframe 8 are either downlink subframes or the first subframes, a subframe 2 is the second subframe, and a subframe 3 and a subframe 4 are uplink subframes; or when the uplink-downlink configuration of the first serving cell is the uplink-downlink configuration d, the radio frame includes 10 subframes, where a subframe 0, a subframe 1, a subframe 4, a subframe 5, a subframe 8, and a subframe 9 are the first subframes, a subframe 6 and a subframe 7 are either downlink subframes or the first subframes, a subframe 2 is the second subframe, and a subframe 3 is an uplink subframe.

Further, optionally, determining, by the first user equipment, the frame structure of the first serving cell may be determining the frame structure of the first serving cell according to the uplink-downlink configuration of the first serving cell and Table 3, or may be determining the frame structure of the first serving cell according to the uplink-downlink configuration of the first serving cell and Table 4. For other descriptions of Table 3 and Table 4, refer to the first embodiment. Details are not described herein again.

It should be noted that the present invention imposes no limitation on the uplink-downlink configuration of the first serving cell. That is, the uplink-downlink configuration of the first serving cell is not limited to that in Table 3. However, when the frame structure of the first serving cell needs to coexist with a frame structure type 2 of an existing LTE system, the uplink-downlink configuration of the first serving cell is preferentially the uplink-downlink configuration 0, the uplink-downlink configuration 1, the uplink-downlink configuration 3, or the uplink-downlink configuration 4.

Compared with Table 4, in Table 3, some first subframes are converted into downlink subframes. This ensures that the frame structure of the first serving cell can coexist with an existing LTE frame structure 2, and reduces GP overheads.

In all the embodiments of the present invention, the first serving cell corresponding to the first user equipment may be a serving cell configured by a network side device for the first user equipment, a serving cell that serves the first user equipment, or a serving cell accessed by the first user equipment. A serving cell in this embodiment of the present invention may also be referred to as a component carrier. In this embodiment of the present invention, the first serving cell may be a primary serving cell or a secondary serving cell of the first user equipment.

S11. The first user equipment sends and receives, in the first serving cell, information based on the frame structure of the first serving cell.

Sending and receiving, by the first user equipment in the first serving cell, the information based on the frame structure of the first serving cell may be performed according to the following uplink HARQ timing:

The first user equipment receives, in a subframe n−k, physical downlink shared channel PDSCH transmission or a downlink control channel that indicates downlink semi-persistent scheduling SPS release. The physical downlink shared channel PDSCH or the downlink control channel that indicates the downlink semi-persistent scheduling SPS release is transmitted in the first serving cell, and n is a nonnegative integer. The first user equipment sends, in a subframe n, an HARQ-ACK corresponding to the physical downlink shared channel or the downlink control channel in a subframe n−4. The HARQ-ACK corresponding to the physical downlink shared channel or the downlink control channel is transmitted in the first serving cell. It should be noted that n and n−4 are subframe numbers.

Sending and receiving, by the first user equipment in the first serving cell, the information based on the frame structure of the first serving cell may be performed according to the following downlink HARQ timing:

The first user equipment receives, in a subframe i, a downlink control channel scheduling a physical uplink shared channel. The first user equipment sends, in a subframe i+k1, the physical uplink shared channel scheduled by the downlink control channel. The physical uplink shared channel scheduled by the downlink control channel is transmitted in the first serving cell, i is a nonnegative integer, k1 is a positive integer, a value of k1 is determined according to timing when an uplink-downlink configuration in a frame structure type 2 is the same as the uplink-downlink configuration of the first serving cell, and the frame structure type 2 is a frame structure type of Long Term Evolution release 8, release 9, release 10, release 11, or release 12. For example, if the uplink-downlink configuration of the first serving cell is the uplink-downlink configuration 0, a value of k1 is the same as that for an uplink-downlink configuration 0 in the frame structure type 2 of LTE release 8, release 9, release 10, release 11, or release 12. For example, if a value of k1 is the same as that for the uplink-downlink configuration in the frame structure type 2 of LTE release 8 when the uplink-downlink configuration in the frame structure type 2 of LTE release 8 is the same as the uplink-downlink configuration of the first serving cell, the value of k1 is shown in Table 5. It should be noted that i and i+k1 are subframe numbers.

Alternatively, sending and receiving, by the first user equipment in the first serving cell, the information based on the frame structure of the first serving cell may be performed according to the following downlink HARQ timing:

The first user equipment sends a physical uplink shared channel in a subframe j. The physical uplink shared channel sent by the first user equipment is transmitted in the first serving cell. The first user equipment receives, in a subframe j+k2, an HARQ-ACK corresponding to the physical uplink shared channel. j is a nonnegative integer, k2 is a positive integer, a value of k2 is determined according to timing when an uplink-downlink configuration in a frame structure type 2 is the same as the uplink-downlink configuration of the first serving cell, and the frame structure type 2 is a frame structure type of Long Term Evolution release 8, release 9, release 10, release 11, or release 12. For example, if the uplink-downlink configuration of the first serving cell is the uplink-downlink configuration 0, a value of k2 is the same as that for an uplink-downlink configuration 0 in the frame structure type 2 of LTE release 8, release 9, release 10, release 11, or release 12. For example, if a value of k2 is the same as that for the uplink-downlink configuration in the frame structure type 2 of LTE release 8 when the uplink-downlink configuration in the frame structure type 2 of LTE release 8 is the same as the uplink-downlink configuration of the first serving cell, the value of k2 is shown in Table 6. It should be noted that j and j+k2 are subframe numbers.

Alternatively, sending and receiving, by the first user equipment in the first serving cell, the information based on the frame structure of the first serving cell may be performed according to the following downlink HARQ timing:

The first user equipment receives, in a subframe m, an HARQ-ACK corresponding to a physical uplink shared channel. The first user equipment sends, in a subframe m+k3, the physical uplink shared channel corresponding to the HARQ-ACK. The physical uplink shared channel corresponding to the HARQ-ACK is transmitted in the first serving cell, m is a nonnegative integer, k3 is a positive integer, a value of k3 is determined according to timing when an uplink-downlink configuration in a frame structure type 2 is the same as the uplink-downlink configuration of the first serving cell, and the frame structure type 2 is a frame structure type of Long Term Evolution release 8, release 9, release 10, release 11, or release 12. For example, if the uplink-downlink configuration of the first serving cell is the uplink-downlink configuration 0, a value of k3 is the same as that for an uplink-downlink configuration 0 in the frame structure type 2 of LTE release 8, release 9, release 10, release 11, or release 12. For example, if a value of k3 is the same as that for the uplink-downlink configuration in the frame structure type 2 of LTE release 8 when the uplink-downlink configuration in the frame structure type 2 of LTE release 8 is the same as the uplink-downlink configuration of the first serving cell, the value of k3 is shown in Table 5. It should be noted that m and m+k3 are subframe numbers.

In S11, when the first user equipment sends and receives, in the first serving cell, the information based on the frame structure of the first serving cell, uplink HARQ timing remains unchanged for different uplink-downlink configurations, and downlink HARQ timing is consistent with that of the existing LTE system. Therefore, implementation complexity and protocol complexity can be reduced. In addition, the uplink HARQ timing ensures that an HARQ-ACK of only one downlink subframe or first subframe needs to be fed back in one uplink subframe or second subframe. Therefore, compared with the existing LTE system in which HARQ-ACKs of multiple downlink subframes need to be fed back in one uplink subframe, a feedback volume is reduced, and HARQ-ACK performance is improved.

Figure 7:
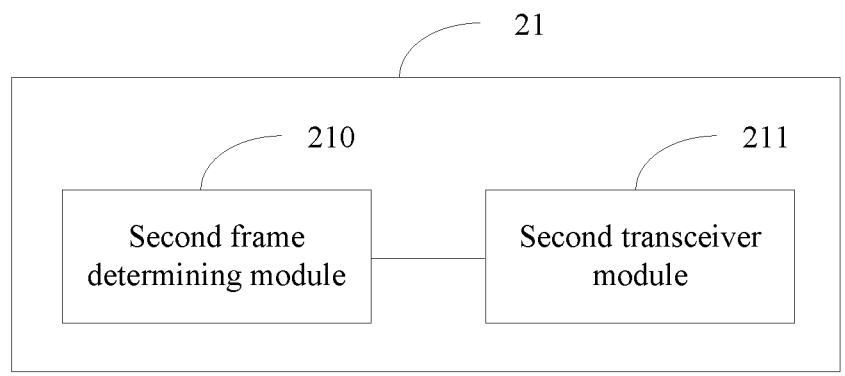
FIG. 7 is a schematic structural diagram of a base station according to a first embodiment of the present invention.

FIG. 7 is a schematic structural diagram of a base station according to a first embodiment of the present invention. As shown in FIG. 7, the base station 21 includes a second frame determining module 210 and a second transceiver module 211. The second frame determining module 210 is configured to determine a frame structure of a first serving cell of first user equipment. The second transceiver module 211 is connected to the second frame determining module 210, and is configured to send or receive, in the first serving cell, information to or from the first user equipment based on the frame structure. The second frame determining module 210 may determine the frame structure of the first serving cell of the first user equipment according to an uplink-downlink configuration of the first serving cell of the first user equipment. Different uplink-downlink configurations are corresponding to different frame structures, and different frame structures are corresponding to different frame compositions.

In the frame structure of the first serving cell, one radio frame includes at least one first subframe and at least one second subframe. Both the first subframe and the second subframe include a symbol used for downlink transmission, a guard period, and a symbol used for uplink transmission. In the first subframe, a quantity of symbols used for downlink transmission is greater than a quantity of symbols used for uplink transmission; and in the second subframe, a quantity of symbols used for downlink transmission is less than a quantity of symbols used for uplink transmission. The first subframe may transmit a physical downlink shared channel PDSCH, and the second subframe may transmit a physical uplink shared channel PUSCH. Further, if a subframe l is the first subframe or a downlink subframe, a subframe l+k is the first subframe, the second subframe, or an uplink subframe. l is a nonnegative integer, and k is a positive integer greater than 1. Therefore, an HARQ-ACK corresponding to the subframe l can be fed back in the subframe l+k, and for different uplink-downlink configurations, the frame structure of the first serving cell has same uplink HARQ-ACK timing. This embodiment of the present invention imposes no limitation on a value of k; and when a length of each subframe in the frame structure of the first serving cell is 1 ms, a value of k is preferentially 4. It should be noted that l and l+k are subframe numbers.

All embodiments of the present invention impose no limitation on the length of each subframe in the frame structure of the first serving cell of the first user equipment, which is preferentially 1 ms. All the embodiments of the present invention impose no limitation on specific subframe structures of the first subframe and the second subframe. FIG. 4 shows subframe structures of the first subframe and the second subframe that have a subframe length of 1 ms. For other descriptions of the first subframe and the second subframe, refer to the first embodiment. Details are not described herein again.

In this embodiment of the present invention, the uplink-downlink configuration of the first serving cell may be an uplink-downlink configuration a, an uplink-downlink configuration b, an uplink-downlink configuration c, or an uplink-downlink configuration d. That is, the uplink-downlink configuration of the first serving cell may be one of the uplink-downlink configuration a, the uplink-downlink configuration b, the uplink-downlink configuration c, or the uplink-downlink configuration d, or may be converted among these uplink-downlink configurations by using higher layer signaling. a, b, c, and d may be indexes of the uplink-downlink configurations. For example, values may be respectively 0, 1, 3, and 4. It should be noted that, in all the embodiments of the present invention, when values of a, b, c, and d may be respectively 0, 1, 3, and 4, this does not mean that the frame structure of the first serving cell is a frame structure corresponding to an uplink-downlink configuration 0, an uplink-downlink configuration 1, an uplink-downlink configuration 3, or an uplink-downlink configuration 4 in Table 2, but means that in one frame, a ratio of a quantity of subframes that may be used to transmit a physical downlink shared channel to a quantity of subframes that may be used to transmit a physical uplink shared channel is the same as that in Table 2. For example, the uplink-downlink configuration 0 indicates that in one frame, a ratio of a quantity of subframes that may be used to transmit a physical downlink shared channel to a quantity of subframes that may be used to transmit a physical uplink shared channel is 2:3; the uplink-downlink configuration 1 indicates that in one frame, a ratio of a quantity of subframes that may be used to transmit a physical downlink shared channel to a quantity of subframes that may be used to transmit a physical uplink shared channel is 3:2; the uplink-downlink configuration 3 indicates that in one frame, a ratio of a quantity of subframes that may be used to transmit a physical downlink shared channel to a quantity of subframes that may be used to transmit a physical uplink shared channel is 7:3; the uplink-downlink configuration 4 indicates that in one frame, a ratio of a quantity of subframes that may be used to transmit a physical downlink shared channel to a quantity of subframes that may be used to transmit a physical uplink shared channel is 8:2.

That the second frame determining module 210 may determine the frame structure of the first serving cell of the first user equipment according to the uplink-downlink configuration of the first serving cell of the first user equipment may be specifically as follows:

When the uplink-downlink configuration of the first serving cell is the uplink-downlink configuration a, the radio frame includes 10 subframes, where a subframe 0 and a subframe 5 are the first subframes, a subframe 1 and a subframe 6 are either downlink subframes or the first subframes, a subframe 2 and a subframe 7 are the second subframes, and a subframe 3, a subframe 4, a subframe 8, and a subframe 9 are uplink subframes;

when the uplink-downlink configuration of the first serving cell is the uplink-downlink configuration b, the radio frame includes 10 subframes, where a subframe 0, a subframe 4, a subframe 5, and a subframe 9 are the first subframes, a subframe 1 and a subframe 6 are either downlink subframes or the first subframes, a subframe 2 and a subframe 7 are the second subframes, and a subframe 3 and a subframe 8 are uplink subframes;

when the uplink-downlink configuration of the first serving cell is the uplink-downlink configuration c, the radio frame includes 10 subframes, where a subframe 0, a subframe 1, a subframe 5, and a subframe 9 are the first subframes, a subframe 6, a subframe 7, and a subframe 8 are either downlink subframes or the first subframes, a subframe 2 is the second subframe, and a subframe 3 and a subframe 4 are uplink subframes; or when the uplink-downlink configuration of the first serving cell is the uplink-downlink configuration d, the radio frame includes 10 subframes, where a subframe 0, a subframe 1, a subframe 4, a subframe 5, a subframe 8, and a subframe 9 are the first subframes, a subframe 6 and a subframe 7 are either downlink subframes or the first subframes, a subframe 2 is the second subframe, and a subframe 3 is an uplink subframe.

Further, optionally, determining, by the second frame determining module 210, the frame structure of the first serving cell of the first user equipment may be determining the frame structure of the first serving cell according to the uplink-downlink configuration of the first serving cell and Table 3, or may be determining the frame structure of the first serving cell according to the uplink-downlink configuration of the first serving cell and Table 4. For other descriptions of Table 3 and Table 4, refer to the first embodiment. Details are not described herein again.

In all the embodiments of the present invention, the first serving cell corresponding to the first user equipment may be a serving cell configured by a network side device for the first user equipment, a serving cell that serves the first user equipment, or a serving cell accessed by the first user equipment. A serving cell in this embodiment of the present invention may also be referred to as a component carrier. In this embodiment of the present invention, the first serving cell may be a primary serving cell or a secondary serving cell of the first user equipment.

The second transceiver module 211 is configured to send or receive, in the first serving cell, the information to or from the first user equipment based on the frame structure of the first serving cell. Sending or receiving, by the second transceiver module 211 in the first serving cell, the information to or from the first user equipment based on the frame structure of the first serving cell may be performed according to the following uplink HARQ timing:

The second transceiver module 211 sends, to the first user equipment in a subframe n−k, a physical downlink shared channel PDSCH or a downlink control channel that indicates downlink semi-persistent scheduling SPS release. The physical downlink shared channel or the downlink control channel that indicates the downlink semi-persistent scheduling release is transmitted in the first serving cell, and n is a nonnegative integer. The second transceiver module 211 receives, in a subframe n, an HARQ-ACK that is fed back by the first user equipment and that is corresponding to the physical downlink shared channel or the downlink control channel in a subframe n−4. The HARQ-ACK corresponding to the physical downlink shared channel or the downlink control channel is transmitted in the first serving cell. In this embodiment of the present invention, a value of k is preferentially 4. It should be noted that n and n−4 are subframe numbers.

Sending or receiving, by the second transceiver module 211 in the first serving cell, the information to or from the first user equipment based on the frame structure of the first serving cell may be performed according to the following downlink HARQ timing:

The second transceiver module 211 sends, to the first user equipment in a subframe i, a downlink control channel scheduling a physical uplink shared channel. The second transceiver module 211 receives, in a subframe i+k1, the physical uplink shared channel scheduled by the downlink control channel. The physical uplink shared channel scheduled by the downlink control channel is transmitted in the first serving cell, i is a nonnegative integer, k1 is a positive integer, a value of k1 is determined according to timing when an uplink-downlink configuration in a frame structure type 2 is the same as the uplink-downlink configuration of the first serving cell, and the frame structure type 2 is a frame structure type of Long Term Evolution release 8, release 9, release 10, release 11, or release 12. For example, if the uplink-downlink configuration of the first serving cell is the uplink-downlink configuration 0, a value of k1 is the same as that for an uplink-downlink configuration 0 in the frame structure type 2 of LTE release 8, release 9, release 10, release 11, or release 12. For example, if a value of k1 is the same as that for the uplink-downlink configuration in the frame structure type 2 of LTE release 8 when the uplink-downlink configuration in the frame structure type 2 of LTE release 8 is the same as the uplink-downlink configuration of the first serving cell, the value of k1 is shown in Table 5. It should be noted that i and i+k1 are subframe numbers.

Alternatively, sending or receiving, by the second transceiver module 211 in the first serving cell, the information to or from the first user equipment based on the frame structure of the first serving cell may be performed according to the following downlink HARQ timing:

The second transceiver module 211 receives, in a subframe j, a physical uplink shared channel sent by the first user equipment. The physical uplink shared channel is transmitted in the first serving cell. The second transceiver module 211 sends, in a subframe j+k2, an HARQ-ACK corresponding to the physical uplink shared channel. j is a nonnegative integer, k2 is a positive integer, a value of k2 is determined according to timing when an uplink-downlink configuration in a frame structure type 2 is the same as the uplink-downlink configuration of the first serving cell, and the frame structure type 2 is a frame structure type of Long Term Evolution release 8, release 9, release 10, release 11, or release 12. For example, if the uplink-downlink configuration of the first serving cell is the uplink-downlink configuration 0, a value of k2 is the same as that for an uplink-downlink configuration 0 in the frame structure type 2 of LTE release 8, release 9, release 10, release 11, or release 12. For example, if a value of k2 is the same as that for the uplink-downlink configuration in the frame structure type 2 of LTE release 8 when the uplink-downlink configuration in the frame structure type 2 of LTE release 8 is the same as the uplink-downlink configuration of the first serving cell, the value of k2 is shown in Table 6. It should be noted that j and j+k2 are subframe numbers.

Alternatively, sending or receiving, by the second transceiver module 211 in the first serving cell, the information to or from the first user equipment based on the frame structure of the first serving cell may be performed according to the following downlink HARQ timing:

The second transceiver module 211 sends, in a subframe m, an HARQ-ACK that is sent by the first user equipment and that is corresponding to a physical uplink shared channel. The second transceiver module 211 receives, in a subframe m+k3, physical uplink shared channel retransmission. The physical uplink shared channel retransmission is transmitted in the first serving cell, m is a nonnegative integer, k3 is a positive integer, a value of k3 is determined according to timing when an uplink-downlink configuration in a frame structure type 2 is the same as the uplink-downlink configuration of the first serving cell, and the frame structure type 2 is a frame structure type of Long Term Evolution release 8, release 9, release 10, release 11, or release 12. For example, if the uplink-downlink configuration of the first serving cell is the uplink-downlink configuration 0, a value of k3 is the same as that for an uplink-downlink configuration 0 in the frame structure type 2 of LTE release 8, release 9, release 10, release 11, or release 12. For example, if a value of k3 is the same as that for the uplink-downlink configuration in the frame structure type 2 of LTE release 8 when the uplink-downlink configuration in the frame structure type 2 of LTE release 8 is the same as the uplink-downlink configuration of the first serving cell, the value of k3 is shown in Table 5. It should be noted that m and m+k3 are subframe numbers.

In this embodiment of the present invention, when the second transceiver module 211 sends or receives, in the first serving cell, the information to or from the first user equipment based on the frame structure of the first serving cell, uplink HARQ timing remains unchanged for different uplink-downlink configurations, and downlink HARQ timing is consistent with that of an existing LTE system. Therefore, implementation complexity and protocol complexity can be reduced. In addition, the uplink HARQ timing ensures that an HARQ-ACK of only one downlink subframe or first subframe needs to be fed back in one uplink subframe or second subframe. Therefore, compared with the existing LTE system in which HARQ-ACKs of multiple downlink subframes need to be fed back in one uplink subframe, a feedback volume is reduced, and HARQ-ACK performance is improved.

In this embodiment of the present invention, the frame structure of the first serving cell is introduced in an LTE system. However, evolution of a communications system is a step-by-step process, and a frame structure 2 of the existing LTE system also exists. Therefore, a problem of coexistence between a new frame structure and the frame structure 2 of the existing LTE system needs to be resolved.

In this embodiment of the present invention, the new frame structure is introduced to optimize the frame structure 2 of the existing LTE system, and coexistence between the new frame structure and a frame structure 2 of the LTE system is ensured. Therefore, the second frame determining module 210 is further configured to determine a frame structure of a second serving cell. The second serving cell is a serving cell of second user equipment.

The second frame determining module 210 determines the frame structure of the second serving cell. The frame structure of the second serving cell is the same as the frame structure type 2 of LTE release 8, release 9, release 10, release 11, or release 12. That is, the frame structure of the second serving cell is shown in Table 2. Specifically, the second frame determining module 210 may determine the frame structure of the second serving cell according to an uplink-downlink configuration of the second serving cell, or the second frame determining module 210 may determine the frame structure of the second serving cell according to an uplink-downlink configuration of the second serving cell and Table 2.

A frequency resource of the second serving cell is adjacent to or the same as a frequency resource of the first serving cell. When the frequency resource of the first serving cell is the same as the frequency resource of the second serving cell, the first serving cell and the second serving cell may be corresponding to different physical cells. That is, corresponding physical cell IDs are different.

Figure 8:
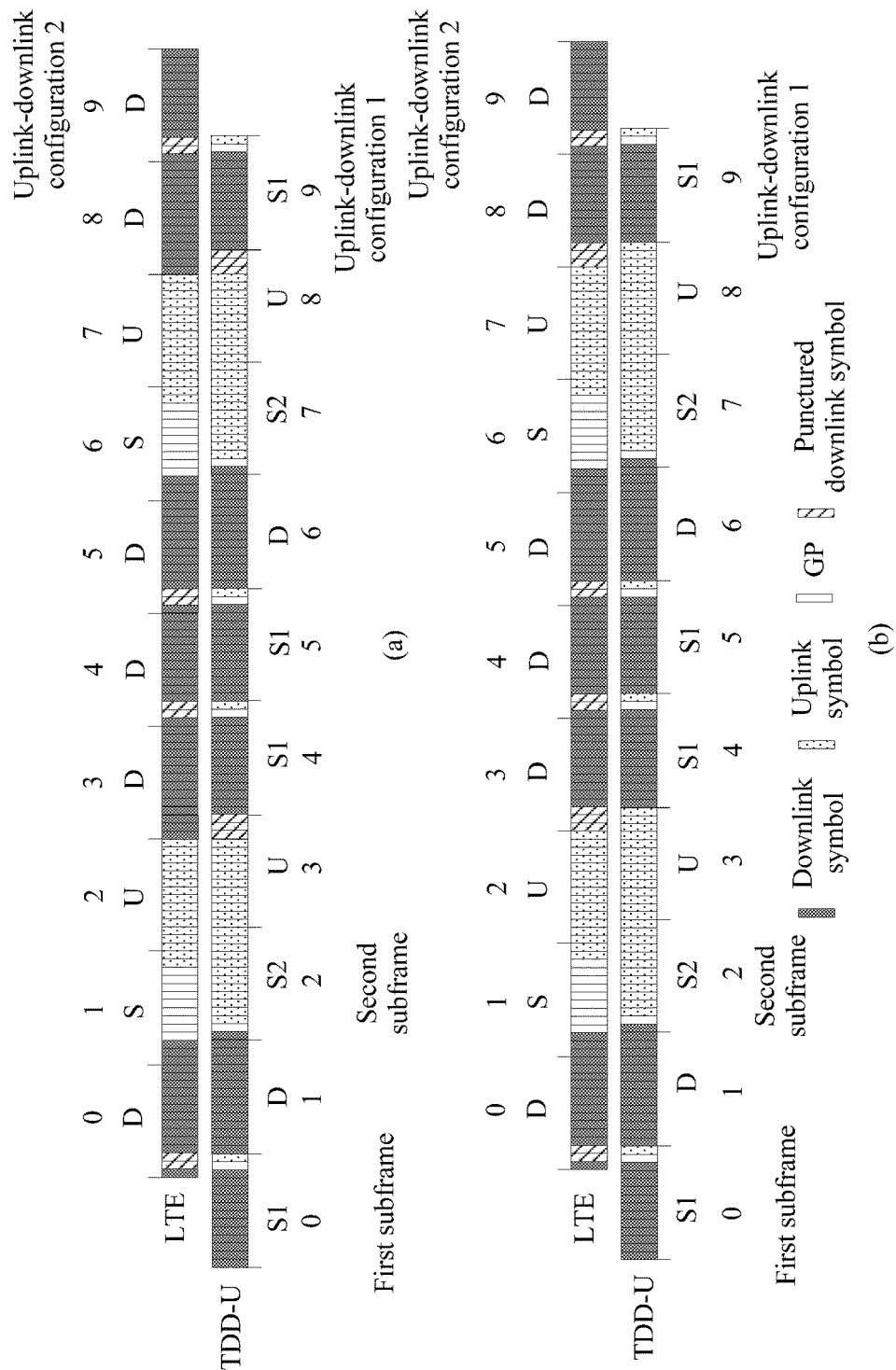
FIG. 8 is a schematic structural diagram of subframes of a first serving cell and a second serving cell according to an embodiment of the present invention.

In this embodiment of the present invention, 11 symbols are shifted between a subframe of the first serving cell and that of the second serving cell. For example, as shown in FIG. 8, 11 symbols are shifted forward for the subframe of the first serving cell compared with the subframe of the second serving cell. In this case, last three symbols (including a GP with duration of one symbol) of the first subframe in the frame structure of the first serving cell overlap with first three symbols of a downlink subframe in the frame structure 2 of the existing LTE system. Therefore, coexistence between the frame structure of the first serving cell and a frame structure type 2 of the existing LTE system can be implemented by puncturing the second symbol and the third symbol of the downlink subframe in the frame structure 2 of the LTE system. In the frame structure type 2 of the existing LTE system, the second user equipment may be instructed, by indicating a start symbol of a PDSCH, to puncture the second symbol and the third symbol of a downlink subframe, and a PDCCH can still be received in the first symbol.

In this embodiment of the present invention, when the uplink-downlink configuration of the first serving cell is the uplink-downlink configuration a, the uplink-downlink configuration of the second serving cell is an uplink-downlink configuration 1. When the uplink-downlink configuration of the first serving cell is the uplink-downlink configuration b, the uplink-downlink configuration of the second serving cell is an uplink-downlink configuration 2. When the uplink-downlink configuration of the first serving cell is the uplink-downlink configuration c, the uplink-downlink configuration of the second serving cell is an uplink-downlink configuration 4. When the uplink-downlink configuration of the first serving cell is the uplink-downlink configuration d, the uplink-downlink configuration of the second serving cell is an uplink-downlink configuration 5.

In this way, limitations are imposed on the uplink-downlink configuration of the first serving cell and the uplink-downlink configuration of the second serving cell, so that an uplink subframe in the frame structure type 2 of the existing LTE system is not punctured, and coexistence between the frame structure of the first serving cell and the frame structure type 2 of the existing LTE system is implemented, because no mechanism is used to instruct the second user equipment to puncture the uplink subframe in the frame structure type 2 of the existing LTE system.

Further, a special subframe configuration in the frame structure of the second serving cell is a special subframe configuration 5 or a special subframe configuration 0. According to this manner, the second user equipment does not receive a PDSCH in a special subframe or does not perform measurement in the fourth symbol to the twelfth symbol of a special subframe based on a downlink reference signal, so as to implicitly puncture the special subframe of the existing LTE system; in addition, a subframe 2 and a subframe 7 in the frame structure type 2 of the existing LTE system are complete uplink subframes, thereby implementing coexistence between the frame structure of the first serving cell and the frame structure type 2 of the existing LTE system.

Based on the foregoing features, last three symbols of an uplink subframe in the frame structure of the first serving cell overlap with the first three symbols of the downlink subframe in the frame structure type 2 of the existing LTE system. In this case, the first three symbols of the downlink subframe in the frame structure type 2 of the existing LTE system may be punctured, because puncturing the first three symbols of the downlink subframe in the frame structure type 2 of the existing LTE system may be implemented by notifying a PDSCH start time of the second user equipment. Alternatively, the last three symbols of the uplink subframe in the frame structure type of the first serving cell may be punctured, because new signaling may be designed to indicate that the last three symbols of the uplink subframe supporting the frame structure of the first serving cell are punctured. FIG. 8a and FIG. 8b respectively show schematic diagrams of frame structures of a first serving cell and a second serving cell in two puncturing schemes when an uplink-downlink configuration of the first serving cell is an uplink-downlink configuration 0 and an uplink-downlink configuration of the second serving cell is an uplink-downlink configuration 1.

The second serving cell corresponding to the second user equipment may be a serving cell configured by a network side device for the second user equipment, a serving cell that serves the second user equipment, or a serving cell accessed by the second user equipment. A serving cell in this embodiment of the present invention may also be referred to as a component carrier. In this embodiment of the present invention, the second serving cell may be a primary serving cell or a secondary serving cell of the second user equipment. In addition, in all the embodiments of the present invention, the first serving cell or the second serving cell does not indicate a sequence of serving cells of user equipment, but is merely intended to distinguish between the two serving cells, the first serving cell and the second serving cell.

It should be noted that the second user equipment and the first user equipment herein are not same user equipment. The first user equipment may be user equipment supporting a release later than LTE release 12. The second user equipment may be user equipment supporting LTE release 12 and/or an earlier LTE release. For example, the second user equipment may be user equipment supporting LTE release 12 and an earlier LTE release, the second user equipment may be user equipment supporting LTE release 11 and an earlier LTE release, the second user equipment may be user equipment supporting LTE release 10 and an earlier LTE release, the second user equipment may be user equipment supporting LTE release 9 and an earlier LTE release, or the second user equipment may be user equipment supporting LTE release 8.

In this embodiment of the present invention, the second transceiver module 211 is further configured to send or receive, in the second serving cell, information to or from the second user equipment based on the frame structure.

The second transceiver module 211 sends, in a downlink subframe n1, a physical downlink shared channel to the second user equipment in the second serving cell. A start symbol of the physical downlink shared channel transmission is the fourth symbol of the downlink subframe n1, and n1 is a nonnegative integer.

Alternatively, the second transceiver module 211 sends, in a downlink subframe n2, a physical downlink control channel to the second user equipment in the second serving cell. The physical downlink control channel is carried in the first symbol of the downlink subframe n2, n2 is a nonnegative integer, and the physical downlink control channel received in the first symbol of the downlink subframe n2 may be a PDCCH corresponding to a common search space.

Alternatively, the second transceiver module 211 indicates a start symbol of a physical downlink shared channel for the second user equipment. The start symbol of the physical downlink shared channel is the fourth symbol. Specifically, if the second user equipment is the user equipment supporting LTE release 12 and an earlier LTE release, or the second user equipment is the user equipment supporting LTE release 11 and an earlier LTE release, the second transceiver module 211 may indicate the start symbol of the physical downlink shared channel by using a PDSCH resource element mapping and quasi-co-location indicator (PDSCH RE Mapping and Quasi-Co-Location Indicator) domain in a downlink control information format 2D. If the second user equipment is the user equipment supporting LTE release 10 and an earlier LTE release, the second transceiver module 211 may indicate the start symbol of the physical downlink shared channel by using RRC signaling. In this case, cross-carrier scheduling is configured for the second user equipment, and the second serving cell is a secondary serving cell of the second user equipment.

Alternatively, the second transceiver module 211 indicates, for the second user equipment, a transmission mode corresponding to a physical downlink shared channel. The transmission mode is a transmission mode 10. In this case, the second user equipment is the user equipment supporting LTE release 12 and an earlier LTE release, or the second user equipment is the user equipment supporting LTE release 11 and an earlier LTE release.

Alternatively, the second transceiver module 211 schedules the second user equipment in a downlink subframe that is not punctured in the frame structure type 2 of the existing LTE system. The second user equipment is the user equipment supporting LTE release 9 and an earlier LTE release or the user equipment supporting LTE release 8; or a transmission mode configured for the second user equipment is one of transmission modes 1 to 9.

Figure 9:
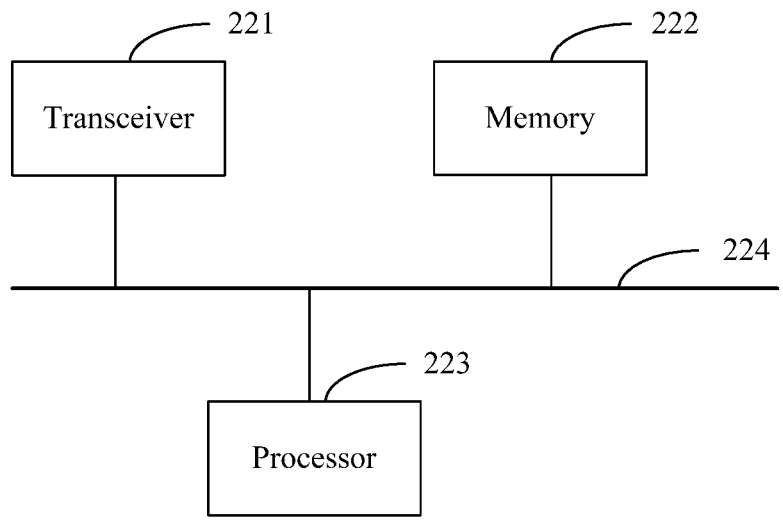
FIG. 9 is a schematic structural diagram of a base station according to a second embodiment of the present invention.

FIG. 9 is a schematic structural diagram of a base station according to a second embodiment of the present invention. As shown in FIG. 9, the base station 22 includes a transceiver 221, a memory 222, a processor 223, and a data bus 224. The transceiver 221, the memory 222, and the processor 223 are connected by using the data bus 224, so as to communicate with each other. The processor 223 is configured to determine a frame structure of a first serving cell of first user equipment. The transceiver 221 is configured to send or receive, in the first serving cell, information to or from the first user equipment based on the frame structure. The memory 222 is configured to store the frame structure of the first serving cell. The processor 223 may determine the frame structure of the first serving cell of the first user equipment according to an uplink-downlink configuration of the first serving cell of the first user equipment. Different uplink-downlink configurations are corresponding to different frame structures, and different frame structures are corresponding to different frame compositions.

In the frame structure of the first serving cell, one radio frame includes at least one first subframe and at least one second subframe. Both the first subframe and the second subframe include a symbol used for downlink transmission, a guard period, and a symbol used for uplink transmission. In the first subframe, a quantity of symbols used for downlink transmission is greater than a quantity of symbols used for uplink transmission; and in the second subframe, a quantity of symbols used for downlink transmission is less than a quantity of symbols used for uplink transmission. The first subframe may transmit a physical downlink shared channel PDSCH, and the second subframe may transmit a physical uplink shared channel PUSCH. Further, if a subframe l is the first subframe or a downlink subframe, a subframe l+k is the first subframe, the second subframe, or an uplink subframe. l is a nonnegative integer, and k is a positive integer greater than 1. Therefore, an HARQ-ACK corresponding to the subframe l can be fed back in the subframe l+k, and for different uplink-downlink configurations, the frame structure of the first serving cell has same uplink HARQ-ACK timing. This embodiment of the present invention imposes no limitation on a value of k; and when a length of each subframe in the frame structure of the first serving cell is 1 ms, a value of k is preferentially 4. It should be noted that l and l+k are subframe numbers.

All embodiments of the present invention impose no limitation on the length of each subframe in the frame structure of the first serving cell of the first user equipment, which is preferentially 1 ms. All the embodiments of the present invention impose no limitation on specific subframe structures of the first subframe and the second subframe. FIG. 4 shows subframe structures of the first subframe and the second subframe that have a subframe length of 1 ms. For other descriptions of the first subframe and the second subframe, refer to the first embodiment. Details are not described herein again.

In this embodiment of the present invention, the uplink-downlink configuration of the first serving cell may be an uplink-downlink configuration a, an uplink-downlink configuration b, an uplink-downlink configuration c, or an uplink-downlink configuration d. That is, the uplink-downlink configuration of the first serving cell may be one of the uplink-downlink configuration a, the uplink-downlink configuration b, the uplink-downlink configuration c, or the uplink-downlink configuration d, or may be converted among these uplink-downlink configurations by using higher layer signaling. a, b, c, and d may be indexes of the uplink-downlink configurations. For example, values may be respectively 0, 1, 3, and 4. It should be noted that, in all the embodiments of the present invention, when values of a, b, c, and d may be respectively 0, 1, 3, and 4, this does not mean that the frame structure of the first serving cell is a frame structure corresponding to an uplink-downlink configuration 0, an uplink-downlink configuration 1, an uplink-downlink configuration 3, or an uplink-downlink configuration 4 in Table 2, but means that in one frame, a ratio of a quantity of subframes that may be used to transmit a physical downlink shared channel to a quantity of subframes that may be used to transmit a physical uplink shared channel is the same as that in Table 2. For example, the uplink-downlink configuration 0 indicates that in one frame, a ratio of a quantity of subframes that may be used to transmit a physical downlink shared channel to a quantity of subframes that may be used to transmit a physical uplink shared channel is 2:3; the uplink-downlink configuration 1 indicates that in one frame, a ratio of a quantity of subframes that may be used to transmit a physical downlink shared channel to a quantity of subframes that may be used to transmit a physical uplink shared channel is 3:2; the uplink-downlink configuration 3 indicates that in one frame, a ratio of a quantity of subframes that may be used to transmit a physical downlink shared channel to a quantity of subframes that may be used to transmit a physical uplink shared channel is 7:3; the uplink-downlink configuration 4 indicates that in one frame, a ratio of a quantity of subframes that may be used to transmit a physical downlink shared channel to a quantity of subframes that may be used to transmit a physical uplink shared channel is 8:2.

That the processor 223 may determine the frame structure of the first serving cell of the first user equipment according to the uplink-downlink configuration of the first serving cell of the first user equipment may be specifically as follows:

When the uplink-downlink configuration of the first serving cell is the uplink-downlink configuration a, the radio frame includes 10 subframes, where a subframe 0 and a subframe 5 are the first subframes, a subframe 1 and a subframe 6 are either downlink subframes or the first subframes, a subframe 2 and a subframe 7 are the second subframes, and a subframe 3, a subframe 4, a subframe 8, and a subframe 9 are uplink subframes;

when the uplink-downlink configuration of the first serving cell is the uplink-downlink configuration b, the radio frame includes 10 subframes, where a subframe 0, a subframe 4, a subframe 5, and a subframe 9 are the first subframes, a subframe 1 and a subframe 6 are either downlink subframes or the first subframes, a subframe 2 and a subframe 7 are the second subframes, and a subframe 3 and a subframe 8 are uplink subframes;

when the uplink-downlink configuration of the first serving cell is the uplink-downlink configuration c, the radio frame includes 10 subframes, where a subframe 0, a subframe 1, a subframe 4, a subframe 5, and a subframe 9 are the first subframes, a subframe 6, a subframe 7, and a subframe 8 are either downlink subframes or the first subframes, a subframe 2 is the second subframe, and a subframe 3 and a subframe 4 are uplink subframes; or when the uplink-downlink configuration of the first serving cell is the uplink-downlink configuration d, the radio frame includes 10 subframes, where a subframe 0, a subframe 1, a subframe 4, a subframe 5, a subframe 8, and a subframe 9 are the first subframes, a subframe 6 and a subframe 7 are either downlink subframes or the first subframes, a subframe 2 is the second subframe, and a subframe 3 is an uplink subframe.

Further, optionally, determining, by the processor 223, the frame structure of the first serving cell of the first user equipment may be determining the frame structure of the first serving cell according to the uplink-downlink configuration of the first serving cell and Table 3, or may be determining the frame structure of the first serving cell according to the uplink-downlink configuration of the first serving cell and Table 4. For other descriptions of Table 3 and Table 4, refer to the first embodiment. Details are not described herein again.

In all the embodiments of the present invention, the first serving cell corresponding to the first user equipment may be a serving cell configured by a network side device for the first user equipment, a serving cell that serves the first user equipment, or a serving cell accessed by the first user equipment. A serving cell in this embodiment of the present invention may also be referred to as a component carrier. In this embodiment of the present invention, the first serving cell may be a primary serving cell or a secondary serving cell of the first user equipment.

The transceiver 221 is configured to send or receive, in the first serving cell, the information to or from the first user equipment based on the frame structure of the first serving cell. Sending or receiving, by the transceiver 221 in the first serving cell, the information to or from the first user equipment based on the frame structure of the first serving cell may be performed according to the following uplink HARQ timing:

The transceiver 221 sends, to the first user equipment in a subframe n−k, a physical downlink shared channel PDSCH or a downlink control channel that indicates downlink semi-persistent scheduling SPS release. The physical downlink shared channel PDSCH or the downlink control channel that indicates the downlink semi-persistent scheduling SPS release is transmitted in the first serving cell, and n is a nonnegative integer. The second transceiver module 211 receives, in a subframe n, an HARQ-ACK that is fed back by the first user equipment and that is corresponding to the physical downlink shared channel or the downlink control channel in a subframe n−4. The HARQ-ACK corresponding to the physical downlink shared channel or the downlink control channel is transmitted in the first serving cell. In this embodiment of the present invention, a value of k is preferentially 4. It should be noted that n and n−4 are subframe numbers.

Sending or receiving, by the transceiver 221 in the first serving cell, the information to or from the first user equipment based on the frame structure of the first serving cell may be performed according to the following downlink HARQ timing:

The transceiver 221 sends, to the first user equipment in a subframe i, a downlink control channel scheduling a physical uplink shared channel. The transceiver 221 receives, in a subframe i+k1, the physical uplink shared channel scheduled by the downlink control channel. The physical uplink shared channel scheduled by the downlink control channel is transmitted in the first serving cell, i is a nonnegative integer, k1 is a positive integer, a value of k1 is determined according to timing when an uplink-downlink configuration in a frame structure type 2 is the same as the uplink-downlink configuration of the first serving cell, and the frame structure type 2 is a frame structure type of Long Term Evolution release 8, release 9, release 10, release 11, or release 12. For example, if the uplink-downlink configuration of the first serving cell is the uplink-downlink configuration 0, a value of k1 is the same as that for an uplink-downlink configuration 0 in the frame structure type 2 of LTE release 8, release 9, release 10, release 11, or release 12. For example, if a value of k1 is the same as that for the uplink-downlink configuration in the frame structure type 2 of LTE release 8 when the uplink-downlink configuration in the frame structure type 2 of LTE release 8 is the same as the uplink-downlink configuration of the first serving cell, the value of k1 is shown in Table 5. It should be noted that i and i+k1 are subframe numbers.

Alternatively, sending or receiving, by the transceiver 221 in the first serving cell, the information to or from the first user equipment based on the frame structure of the first serving cell may be performed according to the following downlink HARQ timing:

The transceiver 221 receives, in a subframe j, a physical uplink shared channel sent by the first user equipment. The physical uplink shared channel sent by the first user equipment is transmitted in the first serving cell. The transceiver 221 sends, in a subframe j+k2, an HARQ-ACK corresponding to the physical uplink shared channel. j is a nonnegative integer, k2 is a positive integer, a value of k2 is determined according to timing when an uplink-downlink configuration in a frame structure type 2 is the same as the uplink-downlink configuration of the first serving cell, and the frame structure type 2 is a frame structure type of Long Term Evolution release 8, release 9, release 10, release 11, or release 12. For example, if the uplink-downlink configuration of the first serving cell is the uplink-downlink configuration 0, a value of k2 is the same as that for an uplink-downlink configuration 0 in the frame structure type 2 of LTE release 8, release 9, release 10, release 11, or release 12. For example, if a value of k2 is the same as that for the uplink-downlink configuration in the frame structure type 2 of LTE release 8 when the uplink-downlink configuration in the frame structure type 2 of LTE release 8 is the same as the uplink-downlink configuration of the first serving cell, the value of k2 is shown in Table 6. It should be noted that j and j+k2 are subframe numbers.

Alternatively, sending or receiving, by the transceiver 221 in the first serving cell, the information to or from the first user equipment based on the frame structure of the first serving cell may be performed according to the following downlink HARQ timing:

The transceiver 221 sends, in a subframe m, an HARQ-ACK that is sent by the first user equipment and that is corresponding to a physical uplink shared channel. The transceiver 221 receives, in a subframe m+k3, physical uplink shared channel retransmission. The physical uplink shared channel retransmission is transmitted in the first serving cell, m is a nonnegative integer, k3 is a positive integer, a value of k3 is determined according to timing when an uplink-downlink configuration in a frame structure type 2 is the same as the uplink-downlink configuration of the first serving cell, and the frame structure type 2 is a frame structure type of Long Term Evolution release 8, release 9, release 10, release 11, or release 12. For example, if the uplink-downlink configuration of the first serving cell is the uplink-downlink configuration 0, a value of k3 is the same as that for an uplink-downlink configuration 0 in the frame structure type 2 of LTE release 8, release 9, release 10, release 11, or release 12. For example, if a value of k3 is the same as that for the uplink-downlink configuration in the frame structure type 2 of LTE release 8 when the uplink-downlink configuration in the frame structure type 2 of LTE release 8 is the same as the uplink-downlink configuration of the first serving cell, the value of k3 is shown in Table 5. It should be noted that m and m+k3 are subframe numbers.

In this embodiment of the present invention, when the transceiver 221 sends or receives, in the first serving cell, the information to or from the first user equipment based on the frame structure of the first serving cell, uplink HARQ timing remains unchanged for different uplink-downlink configurations, and downlink HARQ timing is consistent with that of an existing LTE system. Therefore, implementation complexity and protocol complexity can be reduced. In addition, the uplink HARQ timing ensures that an HARQ-ACK of only one downlink subframe or first subframe needs to be fed back in one uplink subframe or second subframe. Therefore, compared with the existing LTE system in which HARQ-ACKs of multiple downlink subframes need to be fed back in one uplink subframe, a feedback volume is reduced, and HARQ-ACK performance is improved.

In this embodiment of the present invention, the frame structure of the first serving cell is introduced in an LTE system. However, evolution of a communications system is a step-by-step process, and a frame structure 2 of the existing LTE system also exists. Therefore, a problem of coexistence between a new frame structure and the frame structure 2 of the existing LTE system needs to be resolved. In this embodiment of the present invention, the new frame structure is introduced to optimize the frame structure 2 of the existing LTE system, and coexistence between the new frame structure and a frame structure 2 of the LTE system is ensured. Therefore, the processor 223 is further configured to determine a frame structure of a second serving cell. The second serving cell is a serving cell of second user equipment.

The processor 223 determines the frame structure of the second serving cell. The frame structure of the second serving cell is the same as the frame structure type 2 of LTE release 8, release 9, release 10, release 11, or release 12. That is, the frame structure of the second serving cell is shown in Table 2. Specifically, the second frame determining module 210 may determine the frame structure of the second serving cell according to an uplink-downlink configuration of the second serving cell, or the second frame determining module 210 may determine the frame structure of the second serving cell according to an uplink-downlink configuration of the second serving cell and Table 2.

A frequency resource of the second serving cell is adjacent to or the same as a frequency resource of the first serving cell. When the frequency resource of the first serving cell is the same as the frequency resource of the second serving cell, the first serving cell and the second serving cell may be corresponding to different physical cells. That is, corresponding physical cell IDs are different.

In this embodiment of the present invention, 11 symbols are shifted between a subframe of the first serving cell and that of the second serving cell. For example, as shown in FIG. 8, 11 symbols are shifted forward for the subframe of the first serving cell compared with the subframe of the second serving cell. In this case, last three symbols (including a GP with duration of one symbol) of the first subframe in the frame structure of the first serving cell overlap with first three symbols of a downlink subframe in the frame structure 2 of the existing LTE system. Therefore, coexistence between the frame structure of the first serving cell and a frame structure type 2 of the existing LTE system can be implemented by puncturing the second symbol and the third symbol of the downlink subframe in the frame structure 2 of the LTE system. In the frame structure type 2 of the existing LTE system, the second user equipment may be instructed, by indicating a start symbol of a PDSCH, to puncture the second symbol and the third symbol of a downlink subframe, and a PDCCH can still be received in the first symbol.

In this embodiment of the present invention, when the uplink-downlink configuration of the first serving cell is the uplink-downlink configuration a, the uplink-downlink configuration of the second serving cell is an uplink-downlink configuration 1. When the uplink-downlink configuration of the first serving cell is the uplink-downlink configuration b, the uplink-downlink configuration of the second serving cell is an uplink-downlink configuration 2. When the uplink-downlink configuration of the first serving cell is the uplink-downlink configuration c, the uplink-downlink configuration of the second serving cell is an uplink-downlink configuration 4. When the uplink-downlink configuration of the first serving cell is the uplink-downlink configuration d, the uplink-downlink configuration of the second serving cell is an uplink-downlink configuration 5.

In this way, limitations are imposed on the uplink-downlink configuration of the first serving cell and the uplink-downlink configuration of the second serving cell, so that an uplink subframe in the frame structure type 2 of the existing LTE system is not punctured, and coexistence between the frame structure of the first serving cell and the frame structure type 2 of the existing LTE system is implemented, because no mechanism is used to instruct the second user equipment to puncture the uplink subframe in the frame structure type 2 of the existing LTE system.

Further, a special subframe configuration in the frame structure of the second serving cell is a special subframe configuration 5 or a special subframe configuration 0. According to this manner, the second user equipment does not receive a PDSCH in a special subframe or does not perform measurement in the fourth symbol to the twelfth symbol of a special subframe based on a downlink reference signal, so as to implicitly puncture the special subframe of the existing LTE system; in addition, a subframe 2 and a subframe 7 in the frame structure type 2 of the existing LTE system are complete uplink subframes, thereby implementing coexistence between the frame structure of the first serving cell and the frame structure type 2 of the existing LTE system.

Based on the foregoing features, last three symbols of an uplink subframe in the frame structure of the first serving cell overlap with the first three symbols of the downlink subframe in the frame structure type 2 of the existing LTE system. In this case, the first three symbols of the downlink subframe in the frame structure type 2 of the existing LTE system may be punctured, because puncturing the first three symbols of the downlink subframe in the frame structure type 2 of the existing LTE system may be implemented by notifying a PDSCH start time of the second user equipment. Alternatively, the last three symbols of the uplink subframe in the frame structure type of the first serving cell may be punctured, because new signaling may be designed to indicate that the last three symbols of the uplink subframe supporting the frame structure of the first serving cell are punctured. FIG. 8a and FIG. 8b respectively show schematic diagrams of frame structures of a first serving cell and a second serving cell in two puncturing schemes when an uplink-downlink configuration of the first serving cell is an uplink-downlink configuration 0 and an uplink-downlink configuration of the second serving cell is an uplink-downlink configuration 1.

The second serving cell corresponding to the second user equipment may be a serving cell configured by a network side device for the second user equipment, a serving cell that serves the second user equipment, or a serving cell accessed by the second user equipment. A serving cell in this embodiment of the present invention may also be referred to as a component carrier. In this embodiment of the present invention, the second serving cell may be a primary serving cell or a secondary serving cell of the second user equipment. In addition, in all the embodiments of the present invention, the first serving cell or the second serving cell does not indicate a sequence of serving cells of user equipment, but is merely intended to distinguish between the two serving cells, the first serving cell and the second serving cell.

It should be noted that the second user equipment and the first user equipment herein are not same user equipment. The first user equipment may be user equipment supporting a release later than LTE release 12. The second user equipment may be user equipment supporting LTE release 12 and/or an earlier LTE release. For example, the second user equipment may be user equipment supporting LTE release 12 and an earlier LTE release, the second user equipment may be user equipment supporting LTE release 11 and an earlier LTE release, the second user equipment may be user equipment supporting LTE release 10 and an earlier LTE release, the second user equipment may be user equipment supporting LTE release 9 and an earlier LTE release, or the second user equipment may be user equipment supporting LTE release 8.

In this embodiment of the present invention, the transceiver 221 is further configured to send or receive, in the second serving cell, information to or from the second user equipment based on the frame structure. The transceiver 221 sends, in a downlink subframe n1, a physical downlink shared channel to the second user equipment in the second serving cell. A start symbol of the physical downlink shared channel transmission is the fourth symbol of the downlink subframe n1, and n1 is a nonnegative integer.

Alternatively, the transceiver 221 sends, in a downlink subframe n2, a physical downlink control channel to the second user equipment in the second serving cell. The physical downlink control channel is carried in the first symbol of the downlink subframe n2, n2 is a nonnegative integer, and the physical downlink control channel received in the first symbol of the downlink subframe n2 may be a PDCCH corresponding to a common search space.

Alternatively, the transceiver 221 indicates a start symbol of a physical downlink shared channel for the second user equipment. The start symbol of the physical downlink shared channel is the fourth symbol. Specifically, if the second user equipment is the user equipment supporting LTE release 12 and an earlier LTE release, or the second user equipment is the user equipment supporting LTE release 11 and an earlier LTE release, the transceiver 221 may indicate the start symbol of the physical downlink shared channel by using a PDSCH resource element mapping and quasi-co-location indicator (PDSCH RE Mapping and Quasi-Co-Location Indicator) domain in a downlink control information format 2D. If the second user equipment is the user equipment supporting LTE release 10 and an earlier LTE release, the second transceiver module 211 may indicate the start symbol of the physical downlink shared channel by using RRC signaling. In this case, cross-carrier scheduling is configured for the second user equipment, and the second serving cell is a secondary serving cell of the second user equipment.

Alternatively, the transceiver 221 indicates, for the second user equipment, a transmission mode corresponding to a physical downlink shared channel. The transmission mode is a transmission mode 10. In this case, the second user equipment is the user equipment supporting LTE release 12 and an earlier LTE release, or the second user equipment is the user equipment supporting LTE release 11 and an earlier LTE release.

Alternatively, the transceiver 221 schedules the second user equipment in a downlink subframe that is not punctured in the frame structure type 2 of the existing LTE system. The second user equipment is the user equipment supporting LTE release 9 and an earlier LTE release or the user equipment supporting LTE release 8; or a transmission mode configured for the second user equipment is one of transmission modes 1 to 9.

Figure 10:
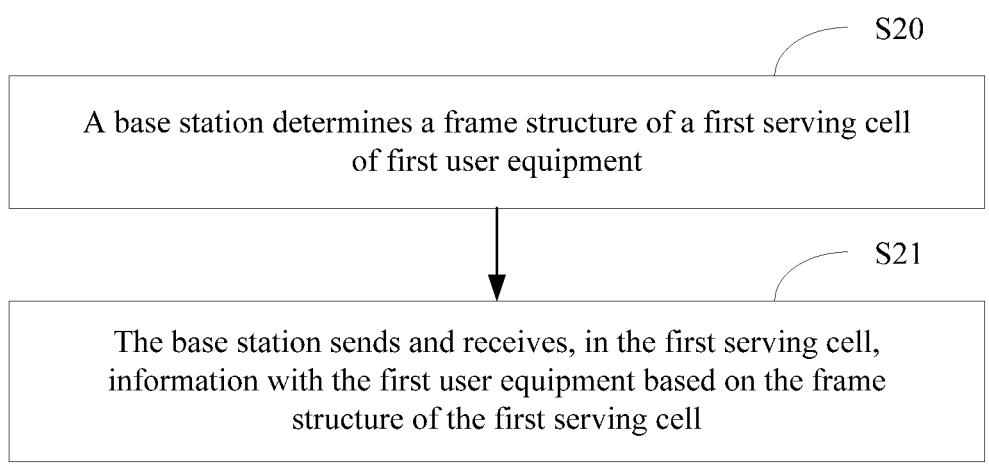
FIG. 10 is a schematic flowchart of an information sending and receiving method according to a second embodiment of the present invention.

FIG. 10 is a schematic flowchart of an information sending and receiving method according to a second embodiment of the present invention. As shown in FIG. 10, the information sending and receiving method includes the following steps.

S20. A base station determines a frame structure of a first serving cell of first user equipment.

In S20, the base station may determine the frame structure of the first serving cell of the first user equipment according to an uplink-downlink configuration of the first serving cell of the first user equipment. Different uplink-downlink configurations are corresponding to different frame structures, and different frame structures are corresponding to different frame compositions.

In the frame structure of the first serving cell, one radio frame includes at least one first subframe and at least one second subframe. Both the first subframe and the second subframe include a symbol used for downlink transmission, a guard period GP, and a symbol used for uplink transmission. In the first subframe, a quantity of symbols used for downlink transmission is greater than a quantity of symbols used for uplink transmission; and in the second subframe, a quantity of symbols used for downlink transmission is less than a quantity of symbols used for uplink transmission. The first subframe may transmit a physical downlink shared channel PDSCH, and the second subframe may transmit a physical uplink shared channel PUSCH. Further, if a subframe l is the first subframe or a downlink subframe, a subframe l+k is the first subframe, the second subframe, or an uplink subframe. l is a nonnegative integer, and k is a positive integer greater than 1. Therefore, an HARQ-ACK corresponding to the subframe l can be fed back in the subframe l+k, and for different uplink-downlink configurations, the frame structure of the first serving cell has same uplink HARQ-ACK timing. This embodiment of the present invention imposes no limitation on a value of k; and when a length of each subframe in the frame structure of the first serving cell is 1 ms, a value of k is preferentially 4. It should be noted that l and l+k are subframe numbers.

All embodiments of the present invention impose no limitation on the length of each subframe in the frame structure of the first serving cell of the first user equipment, which is preferentially 1 ms. All the embodiments of the present invention impose no limitation on specific subframe structures of the first subframe and the second subframe. FIG. 4 shows subframe structures of the first subframe and the second subframe that have a subframe length of 1 ms. For other descriptions of the first subframe and the second subframe, refer to the first embodiment. Details are not described herein again.

In this embodiment of the present invention, the uplink-downlink configuration of the first serving cell may be an uplink-downlink configuration a, an uplink-downlink configuration b, an uplink-downlink configuration c, or an uplink-downlink configuration d. That is, the uplink-downlink configuration of the first serving cell may be one of the uplink-downlink configuration a, the uplink-downlink configuration b, the uplink-downlink configuration c, or the uplink-downlink configuration d, or may be converted among these uplink-downlink configurations by using higher layer signaling. a, b, c, and d may be indexes of the uplink-downlink configurations. For example, values may be respectively 0, 1, 3, and 4. It should be noted that, in all the embodiments of the present invention, when values of a, b, c, and d may be respectively 0, 1, 3, and 4, this does not mean that the frame structure of the first serving cell is a frame structure corresponding to an uplink-downlink configuration 0, an uplink-downlink configuration 1, an uplink-downlink configuration 3, or an uplink-downlink configuration 4 in Table 2, but means that in one frame, a ratio of a quantity of subframes that may be used to transmit a physical downlink shared channel to a quantity of subframes that may be used to transmit a physical uplink shared channel is the same as that in Table 2. For example, the uplink-downlink configuration 0 indicates that in one frame, a ratio of a quantity of subframes that may be used to transmit a physical downlink shared channel to a quantity of subframes that may be used to transmit a physical uplink shared channel is 2:3; the uplink-downlink configuration 1 indicates that in one frame, a ratio of a quantity of subframes that may be used to transmit a physical downlink shared channel to a quantity of subframes that may be used to transmit a physical uplink shared channel is 3:2; the uplink-downlink configuration 3 indicates that in one frame, a ratio of a quantity of subframes that may be used to transmit a physical downlink shared channel to a quantity of subframes that may be used to transmit a physical uplink shared channel is 7:3; the uplink-downlink configuration 4 indicates that in one frame, a ratio of a quantity of subframes that may be used to transmit a physical downlink shared channel to a quantity of subframes that may be used to transmit a physical uplink shared channel is 8:2.

That the base station may determine the frame structure of the first serving cell of the first user equipment according to the uplink-downlink configuration of the first serving cell of the first user equipment may be specifically as follows:

When the uplink-downlink configuration of the first serving cell is the uplink-downlink configuration a, the radio frame includes 10 subframes, where a subframe 0 and a subframe 5 are the first subframes, a subframe 1 and a subframe 6 are either downlink subframes or the first subframes, a subframe 2 and a subframe 7 are the second subframes, and a subframe 3, a subframe 4, a subframe 8, and a subframe 9 are uplink subframes;

when the uplink-downlink configuration of the first serving cell is the uplink-downlink configuration b, the radio frame includes 10 subframes, where a subframe 0, a subframe 4, a subframe 5, and a subframe 9 are the first subframes, a subframe 1 and a subframe 6 are either downlink subframes or the first subframes, a subframe 2 and a subframe 7 are the second subframes, and a subframe 3 and a subframe 8 are uplink subframes;

when the uplink-downlink configuration of the first serving cell is the uplink-downlink configuration c, the radio frame includes 10 subframes, where a subframe 0, a subframe 1, a subframe 5, and a subframe 9 are the first subframes, a subframe 6, a subframe 7, and a subframe 8 are either downlink subframes or the first subframes, a subframe 2 is the second subframe, and a subframe 3 and a subframe 4 are uplink subframes; or when the uplink-downlink configuration of the first serving cell is the uplink-downlink configuration d, the radio frame includes 10 subframes, where a subframe 0, a subframe 1, a subframe 4, a subframe 5, a subframe 8, and a subframe 9 are the first subframes, a subframe 6 and a subframe 7 are either downlink subframes or the first subframes, a subframe 2 is the second subframe, and a subframe 3 is an uplink subframe.

Further, optionally, determining, by the base station, the frame structure of the first serving cell of the first user equipment may be determining the frame structure of the first serving cell according to the uplink-downlink configuration of the first serving cell and Table 3, or may be determining the frame structure of the first serving cell according to the uplink-downlink configuration of the first serving cell and Table 4. For other descriptions of Table 3 and Table 4, refer to the first embodiment. Details are not described herein again.

In all the embodiments of the present invention, the first serving cell corresponding to the first user equipment may be a serving cell configured by a network side device for the first user equipment, a serving cell that serves the first user equipment, or a serving cell accessed by the first user equipment. A serving cell in this embodiment of the present invention may also be referred to as a component carrier. In this embodiment of the present invention, the first serving cell may be a primary serving cell or a secondary serving cell of the first user equipment.

S21. The base station sends or receives, in the first serving cell, information to or from the first user equipment based on the frame structure of the first serving cell.

In S21, sending or receiving, by the base station in the first serving cell, the information to or from the first user equipment based on the frame structure of the first serving cell may be performed according to the following uplink HARQ timing:

The base station sends, to the first user equipment in a subframe n−k, physical downlink shared channel PDSCH transmission or a downlink control channel that indicates downlink semi-persistent scheduling SPS release. The physical downlink shared channel PDSCH or the downlink control channel that indicates the downlink semi-persistent scheduling SPS release is transmitted in the first serving cell, and n is a nonnegative integer. The base station receives, in a subframe n, an HARQ-ACK that is fed back by the first user equipment and that is corresponding to the physical downlink shared channel or the downlink control channel in a subframe n−4. The HARQ-ACK corresponding to the physical downlink shared channel or the downlink control channel is transmitted in the first serving cell. In this embodiment of the present invention, a value of k is preferentially 4. It should be noted that n and n-k are subframe numbers.

Sending or receiving, by the base station in the first serving cell, the information to or from the first user equipment based on the frame structure of the first serving cell may be performed according to the following downlink HARQ timing:

The base station sends, to the first user equipment in a subframe i, a downlink control channel scheduling a physical uplink shared channel. The base station receives, in a subframe i+k1, the physical uplink shared channel scheduled by the downlink control channel. The physical uplink shared channel scheduled by the downlink control channel is transmitted in the first serving cell, i is a nonnegative integer, k1 is a positive integer, a value of k1 is determined according to timing when an uplink-downlink configuration in a frame structure type 2 is the same as the uplink-downlink configuration of the first serving cell, and the frame structure type 2 is a frame structure type of Long Term Evolution release 8, release 9, release 10, release 11, or release 12. For example, if the uplink-downlink configuration of the first serving cell is the uplink-downlink configuration 0, a value of k1 is the same as that for an uplink-downlink configuration 0 in the frame structure type 2 of LTE release 8, release 9, release 10, release 11, or release 12. For example, if a value of k1 is the same as that for the uplink-downlink configuration in the frame structure type 2 of LTE release 8 when the uplink-downlink configuration in the frame structure type 2 of LTE release 8 is the same as the uplink-downlink configuration of the first serving cell, the value of k1 is shown in Table 5. It should be noted that i and i+k1 are subframe numbers.

Alternatively, sending or receiving, by the base station in the first serving cell, the information to or from the first user equipment based on the frame structure of the first serving cell may be performed according to the following downlink HARQ timing:

The base station receives, in a subframe j, a physical uplink shared channel sent by the first user equipment. The physical uplink shared channel sent by the first user equipment is transmitted in the first serving cell. The base station sends, in a subframe j+k2, an HARQ-ACK corresponding to the physical uplink shared channel. j is a nonnegative integer, k2 is a positive integer, a value of k2 is determined according to timing when an uplink-downlink configuration in a frame structure type 2 is the same as the uplink-downlink configuration of the first serving cell, and the frame structure type 2 is a frame structure type of Long Term Evolution release 8, release 9, release 10, release 11, or release 12. For example, if the uplink-downlink configuration of the first serving cell is the uplink-downlink configuration 0, a value of k2 is the same as that for an uplink-downlink configuration 0 in the frame structure type 2 of LTE release 8, release 9, release 10, release 11, or release 12. For example, if a value of k2 is the same as that for the uplink-downlink configuration in the frame structure type 2 of LTE release 8 when the uplink-downlink configuration in the frame structure type 2 of LTE release 8 is the same as the uplink-downlink configuration of the first serving cell, the value of k2 is shown in Table 6. It should be noted that j and j+k2 are subframe numbers.

Alternatively, sending or receiving, by the base station in the first serving cell, the information to or from the first user equipment based on the frame structure of the first serving cell may be performed according to the following downlink HARQ timing:

The base station sends, in a subframe m, an HARQ-ACK that is sent by the first user equipment and that is corresponding to a physical uplink shared channel. The base station receives, in a subframe m+k3, physical uplink shared channel retransmission. The physical uplink shared channel retransmission is transmitted in the first serving cell, m is a nonnegative integer, k3 is a positive integer, a value of k3 is determined according to timing when an uplink-downlink configuration in a frame structure type 2 is the same as the uplink-downlink configuration of the first serving cell, and the frame structure type 2 is a frame structure type of Long Term Evolution release 8, release 9, release 10, release 11, or release 12. For example, if the uplink-downlink configuration of the first serving cell is the uplink-downlink configuration 0, a value of k3 is the same as that for an uplink-downlink configuration 0 in the frame structure type 2 of LTE release 8, release 9, release 10, release 11, or release 12. For example, if a value of k3 is the same as that for the uplink-downlink configuration in the frame structure type 2 of LTE release 8 when the uplink-downlink configuration in the frame structure type 2 of LTE release 8 is the same as the uplink-downlink configuration of the first serving cell, the value of k3 is shown in Table 5. It should be noted that m and m+k3 are subframe numbers.

In this embodiment of the present invention, when the base station sends or receives, in the first serving cell, the information to or from the first user equipment based on the frame structure of the first serving cell, uplink HARQ timing remains unchanged for different uplink-downlink configurations, and downlink HARQ timing is consistent with that of an existing LTE system. Therefore, implementation complexity and protocol complexity can be reduced. In addition, the uplink HARQ timing ensures that an HARQ-ACK of only one downlink subframe or first subframe needs to be fed back in one uplink subframe or second subframe. Therefore, compared with the existing LTE system in which HARQ-ACKs of multiple downlink subframes need to be fed back in one uplink subframe, a feedback volume is reduced, and HARQ-ACK performance is improved.

Figure 11:
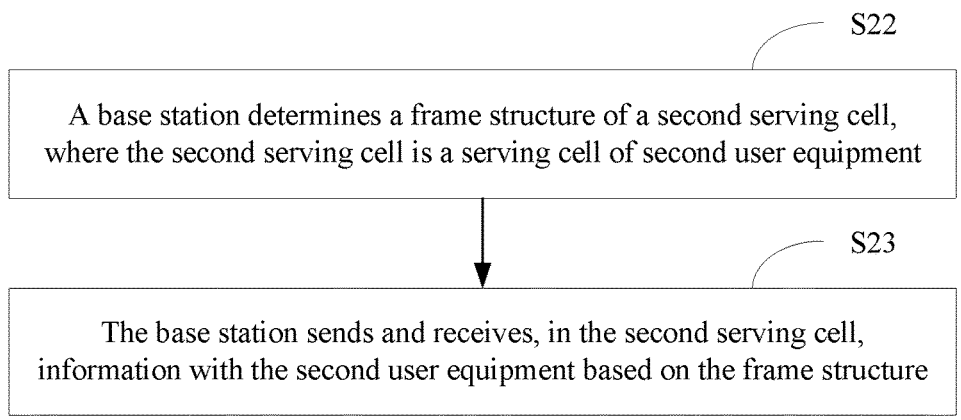
FIG. 11 is a schematic flowchart of an information sending and receiving method according to a third embodiment of the present invention.

In this embodiment of the present invention, the frame structure of the first serving cell is introduced in an LTE system. However, evolution of a communications system is a step-by-step process, and a frame structure 2 of the existing LTE system also exists. Therefore, a problem of coexistence between a new frame structure and the frame structure 2 of the existing LTE system needs to be resolved. In this embodiment of the present invention, the new frame structure is introduced to optimize the frame structure 2 of the existing LTE system, and coexistence between the new frame structure and a frame structure 2 of the LTE system is ensured. FIG. 11 is a schematic flowchart of an information sending and receiving method according to a third embodiment of the present invention. As shown in FIG. 11, the information sending and receiving method further includes the following steps.

S22. A base station determines a frame structure of a second serving cell, where the second serving cell is a serving cell of second user equipment.

The base station determines the frame structure of the second serving cell. The frame structure of the second serving cell is the same as a frame structure type 2 of LTE release 8, release 9, release 10, release 11, or release 12. That is, the frame structure of the second serving cell is shown in Table 2. Specifically, the base station may determine the frame structure of the second serving cell according to an uplink-downlink configuration of the second serving cell, or the base station may determine the frame structure of the second serving cell according to an uplink-downlink configuration of the second serving cell and Table 2.

A frequency resource of the second serving cell is adjacent to or the same as a frequency resource of a first serving cell. When the frequency resource of the first serving cell is the same as the frequency resource of the second serving cell, the first serving cell and the second serving cell may be corresponding to different physical cells. That is, corresponding physical cell IDs are different.

In this embodiment of the present invention, 11 symbols are shifted between a subframe of the first serving cell and that of the second serving cell. For example, as shown in FIG. 8, 11 symbols are shifted forward for the subframe of the first serving cell compared with the subframe of the second serving cell. In this case, last three symbols (including a GP with duration of one symbol) of a first subframe in a frame structure of the first serving cell overlap with first three symbols of a downlink subframe in a frame structure 2 of an existing LTE system. Therefore, coexistence between the frame structure of the first serving cell and a frame structure type 2 of the existing LTE system can be implemented by puncturing the second symbol and the third symbol of the downlink subframe in a frame structure 2 of an LTE system. In the frame structure type 2 of the existing LTE system, the second user equipment may be instructed, by indicating a start symbol of a PDSCH, to puncture the second symbol and the third symbol of a downlink subframe, and a PDCCH can still be received in the first symbol.

In this embodiment of the present invention, when an uplink-downlink configuration of the first serving cell is an uplink-downlink configuration a, the uplink-downlink configuration of the second serving cell is an uplink-downlink configuration 1. When an uplink-downlink configuration of the first serving cell is an uplink-downlink configuration b, the uplink-downlink configuration of the second serving cell is an uplink-downlink configuration 2. When an uplink-downlink configuration of the first serving cell is an uplink-downlink configuration c, the uplink-downlink configuration of the second serving cell is an uplink-downlink configuration 4. When an uplink-downlink configuration of the first serving cell is an uplink-downlink configuration d, the uplink-downlink configuration of the second serving cell is an uplink-downlink configuration 5.

In this way, limitations are imposed on the uplink-downlink configuration of the first serving cell and the uplink-downlink configuration of the second serving cell, so that an uplink subframe in the frame structure type 2 of the existing LTE system is not punctured, and coexistence between the frame structure of the first serving cell and the frame structure type 2 of the existing LTE system is implemented, because no mechanism is used to instruct the second user equipment to puncture the uplink subframe in the frame structure type 2 of the existing LTE system.

Further, a special subframe configuration in the frame structure of the second serving cell is a special subframe configuration 5 or a special subframe configuration 0. According to this manner, the second user equipment does not receive a PDSCH in a special subframe or does not perform measurement in the fourth symbol to the twelfth symbol of a special subframe based on a downlink reference signal, so as to implicitly puncture the special subframe of the existing LTE system; in addition, a subframe 2 and a subframe 7 in the frame structure type 2 of the existing LTE system are complete uplink subframes, thereby implementing coexistence between the frame structure of the first serving cell and the frame structure type 2 of the existing LTE system.

Based on the foregoing features, last three symbols of an uplink subframe in the frame structure of the first serving cell overlap with the first three symbols of the downlink subframe in the frame structure type 2 of the existing LTE system. In this case, the first three symbols of the downlink subframe in the frame structure type 2 of the existing LTE system may be punctured, because puncturing the first three symbols of the downlink subframe in the frame structure type 2 of the existing LTE system may be implemented by notifying a PDSCH start time of the second user equipment. Alternatively, the last three symbols of the uplink subframe in the frame structure type of the first serving cell may be punctured, because new signaling may be designed to indicate that the last three symbols of the uplink subframe supporting the frame structure of the first serving cell are punctured. FIG. 8a and FIG. 8b respectively show schematic diagrams of frame structures of a first serving cell and a second serving cell in two puncturing schemes when an uplink-downlink configuration of the first serving cell is an uplink-downlink configuration 0 and an uplink-downlink configuration of the second serving cell is an uplink-downlink configuration 1.

The second serving cell corresponding to the second user equipment may be a serving cell configured by a network side device for the second user equipment, a serving cell that serves the second user equipment, or a serving cell accessed by the second user equipment. A serving cell in this embodiment of the present invention may also be referred to as a component carrier. In this embodiment of the present invention, the second serving cell may be a primary serving cell or a secondary serving cell of the second user equipment. In addition, in all the embodiments of the present invention, the first serving cell or the second serving cell does not indicate a sequence of serving cells of user equipment, but is merely intended to distinguish between the two serving cells, the first serving cell and the second serving cell.

It should be noted that the second user equipment and the first user equipment herein are not same user equipment. The first user equipment may be user equipment supporting a release later than LTE release 12. The second user equipment may be user equipment supporting LTE release 12 and/or an earlier LTE release. For example, the second user equipment may be user equipment supporting LTE release 12 and an earlier LTE release, the second user equipment may be user equipment supporting LTE release 11 and an earlier LTE release, the second user equipment may be user equipment supporting LTE release 10 and an earlier LTE release, the second user equipment may be user equipment supporting LTE release 9 and an earlier LTE release, or the second user equipment may be user equipment supporting LTE release 8.

S23. The base station sends or receives, in the second serving cell, information to or from the second user equipment based on the frame structure.

In S23, the base station sends, in a downlink subframe n1, a physical downlink shared channel to the second user equipment in the second serving cell. A start symbol of the physical downlink shared channel transmission is the fourth symbol of the downlink subframe n1, and n1 is a nonnegative integer.

Alternatively, the base station sends, in a downlink subframe n2, a physical downlink control channel to the second user equipment in the second serving cell. The physical downlink control channel is carried in the first symbol of the downlink subframe n2, n2 is a nonnegative integer, and the physical downlink control channel received in the first symbol of the downlink subframe n2 may be a PDCCH corresponding to a common search space.

Alternatively, the base station indicates a start symbol of a physical downlink shared channel for the second user equipment. The start symbol of the physical downlink shared channel is the fourth symbol. Specifically, if the second user equipment is the user equipment supporting LTE release 12 and an earlier LTE release, or the second user equipment is the user equipment supporting LTE release 11 and an earlier LTE release, the base station may indicate the start symbol of the physical downlink shared channel by using a PDSCH resource element mapping and quasi-co-location indicator (PDSCH RE Mapping and Quasi-Co-Location Indicator) domain in a downlink control information format 2D. If the second user equipment is the user equipment supporting LTE release 10 and an earlier LTE release, the base station may indicate the start symbol of the physical downlink shared channel by using RRC signaling. In this case, cross-carrier scheduling is configured for the second user equipment, and the second serving cell is a secondary serving cell of the second user equipment.

Alternatively, the base station indicates, for the second user equipment, a transmission mode corresponding to a physical downlink shared channel. The transmission mode is a transmission mode 10. In this case, the second user equipment is the user equipment supporting LTE release 12 and an earlier LTE release, or the second user equipment is the user equipment supporting LTE release 11 and an earlier LTE release.

Alternatively, the base station schedules the second user equipment in a downlink subframe that is not punctured in the frame structure type 2 of the existing LTE system. The second user equipment is the user equipment supporting LTE release 9 and an earlier LTE release or the user equipment supporting LTE release 8; or a transmission mode configured for the second user equipment is one of transmission modes 1 to 9.

It should be noted that this embodiment of the present invention imposes no limitation on an execution sequence of S20 to S23.

Figure 12:
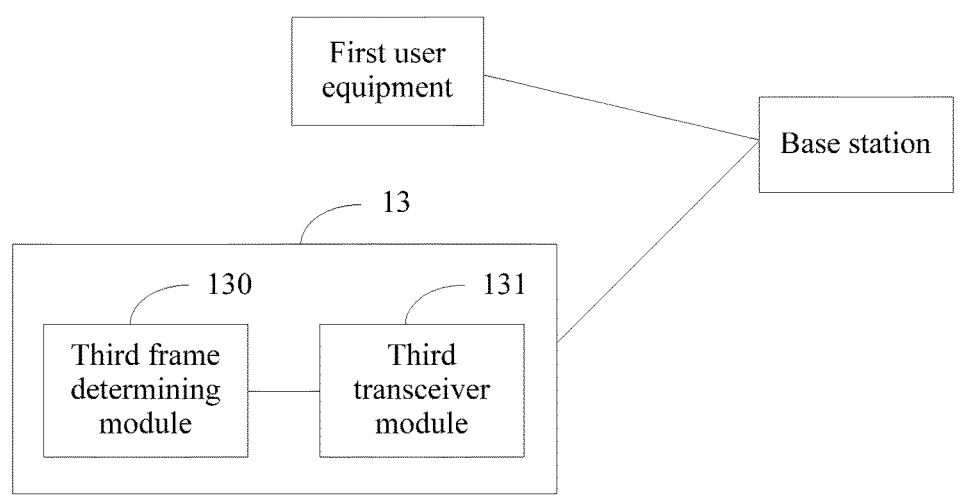
FIG. 12 is a schematic structural diagram of an information sending and receiving system according to an embodiment of the present invention.

FIG. 12 is a schematic structural diagram of an information sending and receiving system according to an embodiment of the present invention. As shown in FIG. 12, the information sending and receiving system 10 includes the foregoing first user equipment, the foregoing base station, and second user equipment 13. In this embodiment of the present invention, a frame structure of a first serving cell is introduced in an LTE system. However, evolution of a communications system is a step-by-step process, and a frame structure 2 of an existing LTE system also exists. Therefore, a problem of coexistence between a new frame structure and the frame structure 2 of the existing LTE system needs to be resolved. Therefore, the information sending and receiving system 10 further includes the second user equipment 13. The second user equipment 13 includes a third frame determining module 130 and a third transceiver module 131. The third frame determining module 130 determines a frame structure of a second serving cell. The third transceiver module 131 sends and receives, in the second serving cell, information based on the frame structure of the second serving cell.

The frame structure of the second serving cell is the same as a frame structure type 2 of Long Term Evolution release 8, release 9, release 10, release 11, or release 12. That is, the frame structure of the second serving cell is shown in Table 2. Specifically, the third frame determining module 130 may determine the frame structure of the second serving cell according to an uplink-downlink configuration of the second serving cell, or the third frame determining module 130 may determine the frame structure of the second serving cell according to an uplink-downlink configuration of the second serving cell and Table 2. When a frequency resource of the first serving cell is adjacent to or the same as a frequency resource of the second serving cell, the problem of coexistence between the new frame structure and the frame structure 2 of the existing LTE system needs to be resolved. In this embodiment of the present invention, the new frame structure is introduced to optimize the frame structure 2 of the existing LTE system, and coexistence between the new frame structure and a frame structure 2 of the LTE system can be further ensured according to the following features. In all embodiments of the present invention, the frame structure of the first serving cell may be referred to as TDD-U or TDD-F.

In this embodiment of the present invention, the frequency resource of the first serving cell is adjacent to or the same as the frequency resource of the second serving cell. When the frequency resource of the first serving cell is the same as the frequency resource of the second serving cell, the first serving cell and the second serving cell may be corresponding to different physical cells. That is, corresponding physical cell IDs are different.

Further, 11 symbols are shifted between a subframe of the first serving cell and that of the second serving cell. For example, as shown in FIG. 8, 11 symbols are shifted forward for the subframe of the first serving cell compared with the subframe of the second serving cell. In this case, last three symbols (including a GP with duration of one symbol) of the first subframe in the frame structure of the first serving cell overlap with first three symbols of a downlink subframe in the frame structure 2 of the existing LTE system. Therefore, coexistence between the frame structure of the first serving cell and a frame structure type 2 of the existing LTE system can be implemented by puncturing the second symbol and the third symbol of the downlink subframe in the frame structure 2 of the LTE system. In the frame structure type 2 of the existing LTE system, the second user equipment 13 may be instructed, by indicating a start symbol of a PDSCH, to puncture the second symbol and the third symbol of a downlink subframe, and a PDCCH can still be received in the first symbol.

In this embodiment of the present invention, when an uplink-downlink configuration of the first serving cell is an uplink-downlink configuration a, the uplink-downlink configuration of the second serving cell is an uplink-downlink configuration 1. When an uplink-downlink configuration of the first serving cell is an uplink-downlink configuration b, the uplink-downlink configuration of the second serving cell is an uplink-downlink configuration 2. When an uplink-downlink configuration of the first serving cell is an uplink-downlink configuration c, the uplink-downlink configuration of the second serving cell is an uplink-downlink configuration 4. When an uplink-downlink configuration of the first serving cell is an uplink-downlink configuration d, the uplink-downlink configuration of the second serving cell is an uplink-downlink configuration 5. Limitations are imposed on the uplink-downlink configuration of the first serving cell and the uplink-downlink configuration of the second serving cell in the foregoing manner, so that an uplink subframe in the frame structure type 2 of the existing LTE system is not punctured, and coexistence between the frame structure of the first serving cell and the frame structure type 2 of the existing LTE system is implemented, because no mechanism is used to instruct the second user equipment 13 to puncture the uplink subframe in the frame structure type 2 of the existing LTE system.

Further, a special subframe configuration in the frame structure of the second serving cell is a special subframe configuration 5 or a special subframe configuration 0. According to this manner, the second user equipment does not receive a PDSCH in a special subframe or does not perform measurement in the fourth symbol to the twelfth symbol of a special subframe based on a downlink reference signal, so as to implicitly puncture the special subframe of the existing LTE system; in addition, a subframe 2 and a subframe 7 in the frame structure type 2 of the existing LTE system are complete uplink subframes, thereby implementing coexistence between the frame structure of the first serving cell and the frame structure type 2 of the existing LTE system.

Based on the foregoing features, last three symbols of an uplink subframe in the frame structure of the first serving cell overlap with the first three symbols of the downlink subframe in the frame structure type 2 of the existing LTE system. In this case, the first three symbols of the downlink subframe in the frame structure type 2 of the existing LTE system may be punctured, because puncturing the first three symbols of the downlink subframe in the frame structure type 2 of the existing LTE system may be implemented by notifying a PDSCH start time of the second user equipment 13. Alternatively, the last three symbols of the uplink subframe in the frame structure type 2 of the first serving cell may be punctured, because new signaling may be designed to indicate that the last three symbols of the uplink subframe supporting the frame structure of the first serving cell are punctured. FIG. 8*a* and FIG. 8*b* respectively show schematic diagrams of frame structures of a first serving cell and a second serving cell in two puncturing schemes when an uplink-downlink configuration of the first serving cell is an uplink-downlink configuration a and an uplink-downlink configuration of the second serving cell is an uplink-downlink configuration 1.

The second serving cell corresponding to the second user equipment 13 may be a serving cell configured by a network side device for the second user equipment 13, a serving cell that serves the second user equipment 13, or a serving cell accessed by the second user equipment 13. A serving cell in this embodiment of the present invention may also be referred to as a component carrier. In this embodiment of the present invention, the second serving cell may be a primary serving cell or a secondary serving cell of the second user equipment 13. In addition, in all the embodiments of the present invention, the first serving cell or the second serving cell does not indicate a sequence of serving cells of user equipment, but is merely intended to distinguish between the two serving cells, the first serving cell and the second serving cell.

It should be noted that the second user equipment 13 and the first user equipment herein are not same user equipment. The first user equipment may be user equipment supporting a release later than LTE release 12. The second user equipment 13 may be user equipment supporting LTE release 12 and/or an earlier LTE release. For example, the second user equipment 13 may be user equipment supporting LTE release 12 and an earlier LTE release, the second user equipment 13 may be user equipment supporting LTE release 11 and an earlier LTE release, the second user equipment 13 may be user equipment supporting LTE release 10 and an earlier LTE release, the second user equipment 13 may be user equipment supporting LTE release 9 and an earlier LTE release, or the second user equipment 13 may be user equipment supporting LTE release 8.

In this embodiment of the present invention, the third transceiver module 131 receives, in a downlink subframe n1, a physical downlink shared channel in the second serving cell. A start symbol of the physical downlink shared channel transmission is the fourth symbol of the downlink subframe n1, and n1 is a nonnegative integer. Alternatively, the third transceiver module 131 receives, in a downlink subframe n2, a physical downlink control channel in the second serving cell. The physical downlink control channel is carried in the first symbol of the downlink subframe n2, n2 is a nonnegative integer, and the physical downlink control channel received in the first symbol of the downlink subframe n2 may be a PDCCH corresponding to a common search space.

It should be noted that this embodiment of the present invention imposes no limitation on an execution sequence of the first user equipment and the second user equipment 13.

In conclusion, in the present invention, first user equipment determines a frame structure of a first serving cell, and sends and receives, in the first serving cell, information based on the frame structure of the first serving cell. In the frame structure of the first serving cell, one radio frame includes at least one first subframe and at least one second subframe, and both the first subframe and the second subframe include a symbol used for downlink transmission, a guard period, and a symbol used for uplink transmission. In the first subframe, a quantity of symbols used for downlink transmission is greater than a quantity of symbols used for uplink transmission; and in the second subframe, a quantity of symbols used for downlink transmission is less than a quantity of symbols used for uplink transmission. This can ensure that a TDD system has same HARQ-ACK timing for different uplink-downlink configurations and can coexist with an existing TDD system.

The foregoing descriptions are merely embodiments of the present invention, and the protection scope of the present invention is not limited thereto. All equivalent structure or process changes made according to the content of this specification and accompanying drawings in the present invention or by directly or indirectly applying the present invention in other related technical fields shall fall within the protection scope of the present invention.

What is claimed is:

1. First user equipment, comprising:
a storage medium including executable instructions; and
a processor;
wherein the executable instructions, when executed by the processor, cause the apparatus to:
determine a frame structure of a first serving cell;
send and receive, in the first serving cell, information based on the frame structure of the first serving cell, wherein
in the frame structure of the first serving cell, one radio frame comprises at least one first subframe and at least one second subframe, and both the first subframe and the second subframe comprise a symbol used for downlink transmission, a guard period, and a symbol used for uplink transmission; in the first subframe, a quantity of symbols used for downlink transmission is greater than a quantity of symbols used for uplink transmission; and in the second subframe, a quantity of symbols used for downlink transmission is less than a quantity of symbols used for uplink transmission,
wherein in the frame structure of the first serving cell, if a subframe l is the first subframe or a downlink subframe, a subframe l+4 is the first subframe, the second subframe, or an uplink subframe, and l is a nonnegative integer.

2. The first user equipment according to claim 1, wherein in the frame structure of the first serving cell, each subframe is a 1 ms subframe, the first subframe comprises 12 symbols used for downlink transmission, a guard period with duration of one symbol, and one symbol used for uplink transmission, and the second subframe comprises one symbol used for downlink transmission, a guard period with duration of one symbol, and 12 symbols used for uplink transmission.

3. The first user equipment according to claim 1, wherein an uplink-downlink configuration of the first serving cell is an uplink-downlink configuration 0, an uplink-downlink configuration 1, an uplink-downlink configuration 3, or an uplink-downlink configuration 4.

4. The first user equipment according to claim 3, wherein:
when the uplink-downlink configuration of the first serving cell is the uplink-downlink configuration 0, the radio frame comprises 10 subframes, wherein a subframe 0 and a subframe 5 are the first subframes, a subframe 1 and a subframe 6 are either downlink subframes or the first subframes, a subframe 2 and a subframe 7 are the second subframes, and a subframe 3, a subframe 4, a subframe 8, and a subframe 9 are uplink subframes;
when the uplink-downlink configuration of the first serving cell is the uplink-downlink configuration 1, the radio frame comprises 10 subframes, wherein a subframe 0, a subframe 4, a subframe 5, and a subframe 9 are the first subframes, a subframe 1 and a subframe 6 are either downlink subframes or the first subframes, a subframe 2 and a subframe 7 are the second subframes, and a subframe 3 and a subframe 8 are uplink subframes;
when the uplink-downlink configuration of the first serving cell is the uplink-downlink configuration 3, the radio frame comprises 10 subframes, wherein a subframe 0, a subframe 1, a subframe 5, and a subframe 9 are the first subframes, a subframe 6, a subframe 7, and a subframe 8 are either downlink subframes or the first subframes, a subframe 2 is the second subframe, and a subframe 3 and a subframe 4 are uplink subframes; or
when the uplink-downlink configuration of the first serving cell is the uplink-downlink configuration 4, the radio frame comprises 10 subframes, wherein a subframe 0, a subframe 1, a subframe 4, a subframe 5, a subframe 8, and a subframe 9 are the first subframes, a subframe 6 and a subframe 7 are either downlink subframes or the first subframes, a subframe 2 is the second subframe, and a subframe 3 is an uplink subframe.

5. The first user equipment according to claim 1, wherein the executable instructions, when executed by the processor, further cause the apparatus to:
receive, in a subframe n−4, a physical downlink shared channel or a downlink control channel that indicates downlink semi-persistent scheduling release, wherein the physical downlink shared channel or the downlink control channel that indicates the downlink semi-persistent scheduling release is transmitted in the first serving cell, and n is a nonnegative integer; and
send, in a subframe n, a hybrid automatic repeat request acknowledgement corresponding to the physical downlink shared channel or the downlink control channel in the subframe n−4, wherein the hybrid automatic repeat request acknowledgement corresponding to the physical downlink shared channel or the downlink control channel is transmitted in the first serving cell.

6. A base station, comprising:
a storage medium including executable instructions; and
a processor;
wherein the executable instructions, when executed by the processor, cause the apparatus to:
determine a frame structure of a first serving cell of first user equipment; and
send or receive, in the first serving cell, information to or from the first user equipment based on the frame structure, wherein
in the frame structure of the first serving cell, one radio frame comprises at least one first subframe and at least one second subframe, and both the first subframe and the second subframe comprise a symbol used for downlink transmission, a guard period, and a symbol used for uplink transmission;
in the first subframe, a quantity of symbols used for downlink transmission is greater than a quantity of symbols used for uplink transmission; and in the second subframe, a quantity of symbols used for downlink transmission is less than a quantity of symbols used for uplink transmission,
wherein in the frame structure of the first serving cell, if a subframe l is the first subframe or a downlink subframe, a subframe l+4 is the first subframe, the second subframe, or an uplink subframe, and l is a nonnegative integer.

7. The base station according to claim 6, wherein in the frame structure of the first serving cell, each subframe is a 1 ms subframe, the first subframe comprises 12 symbols used for downlink transmission, a guard period with duration of one symbol, and one symbol used for uplink transmission, and the second subframe comprises one symbol used for downlink transmission, a guard period with duration of one symbol, and 12 symbols used for uplink transmission.

8. The base station according to claim 6, wherein an uplink-downlink configuration of the first serving cell is an uplink-downlink configuration 0, an uplink-downlink configuration 1, an uplink-downlink configuration 3, or an uplink-downlink configuration 4.

9. The base station according to claim 8, wherein:
when the uplink-downlink configuration of the first serving cell is the uplink-downlink configuration 0, the radio frame comprises 10 subframes, wherein a subframe 0 and a subframe 5 are the first subframes, a subframe 1 and a subframe 6 are either downlink subframes or the first subframes, a subframe 2 and a subframe 7 are the second subframes, and a subframe 3, a subframe 4, a subframe 8, and a subframe 9 are uplink subframes;
when the uplink-downlink configuration of the first serving cell is the uplink-downlink configuration 1, the radio frame comprises 10 subframes, wherein a subframe 0, a subframe 4, a subframe 5, and a subframe 9 are the first subframes, a subframe 1 and a subframe 6 are either downlink subframes or the first subframes, a subframe 2 and a subframe 7 are the second subframes, and a subframe 3 and a subframe 8 are uplink subframes;
when the uplink-downlink configuration of the first serving cell is the uplink-downlink configuration 3, the radio frame comprises 10 subframes, wherein a subframe 0, a subframe 1, a subframe 5, and a subframe 9 are the first subframes, a subframe 6, a subframe 7, and a subframe 8 are either downlink subframes or the first subframes, a subframe 2 is the second subframe, and a subframe 3 and a subframe 4 are uplink subframes; or
when the uplink-downlink configuration of the first serving cell is the uplink-downlink configuration 4, the radio frame comprises 10 subframes, wherein a subframe 0, a subframe 1, a subframe 4, a subframe 5, a subframe 8, and a subframe 9 are the first subframes, a subframe 6 and a subframe 7 are either downlink subframes or the first subframes, a subframe 2 is the second subframe, and a subframe 3 is an uplink subframe.

10. The base station according to claim 6, wherein the executable instructions, when executed by the processor, further cause the apparatus to:
send, to the first user equipment in a subframe n−4, a physical downlink shared channel or a downlink control channel that indicates downlink semi-persistent scheduling release, wherein the physical downlink shared channel or the downlink control channel that indicates the downlink semi-persistent scheduling release is transmitted in the first serving cell, and n is a nonnegative integer; and
receive, in a subframe n, a hybrid automatic repeat request acknowledgement that is fed back by the first user equipment and that is corresponding to the physical downlink shared channel or the downlink control channel in the subframe n−4, wherein the hybrid automatic repeat request acknowledgement corresponding to the physical downlink shared channel or the downlink control channel is transmitted in the first serving cell.

11. The base station according to claim 6, wherein the executable instructions, when executed by the processor, further cause the apparatus to:
send, to the first user equipment in a subframe i, a downlink control channel scheduling a physical uplink shared channel; and
receive, in a subframe i+k1, the physical uplink shared channel scheduled by the downlink control channel, wherein the physical uplink shared channel scheduled by the downlink control channel is transmitted in the first serving cell, i is a nonnegative integer, k1 is a positive integer, a value of k1 is determined according to timing when an uplink-downlink configuration in a frame structure type 2 is the same as the uplink-downlink configuration of the first serving cell, and the frame structure type 2 is a frame structure type of Long Term Evolution release 8, release 9, release 10, release 11, or release 12.

12. An information sending and receiving method, comprising:
determining, by a base station, a frame structure of a first serving cell of first user equipment; and
sending or receiving, by the base station in the first serving cell, information to or from the first user equipment based on the frame structure, wherein
in the frame structure of the first serving cell, one radio frame comprises at least one first subframe and at least one second subframe, and both the first subframe and the second subframe comprise a symbol used for downlink transmission, a guard period, and a symbol used for uplink transmission; in the first subframe, a quantity of symbols used for downlink transmission is greater than a quantity of symbols used for uplink transmission; and in the second subframe, a quantity of symbols used for downlink transmission is less than a quantity of symbols used for uplink transmission,
wherein in the frame structure of the first serving cell, if a subframe l is the first subframe or a downlink subframe, a subframe l+4 is the first subframe, the second subframe, or an uplink subframe, and l is a nonnegative integer.

13. The method according to claim 12, wherein in the frame structure of the first serving cell, each subframe is a 1 ms subframe, the first subframe comprises 12 symbols used for downlink transmission, a guard period with duration of one symbol, and one symbol used for uplink transmission, and the second subframe comprises one symbol used for downlink transmission, a guard period with duration of one symbol, and 12 symbols used for uplink transmission.

14. The method according to claim 12, wherein an uplink-downlink configuration of the first serving cell is an uplink-downlink configuration 0, an uplink-downlink configuration 1, an uplink-downlink configuration 3, or an uplink-downlink configuration 4.

15. The method according to claim 14, wherein:
when the uplink-downlink configuration of the first serving cell is the uplink-downlink configuration 0, the radio frame comprises 10 subframes, wherein a subframe 0 and a subframe 5 are the first subframes, a subframe 1 and a subframe 6 are either downlink subframes or the first subframes, a subframe 2 and a subframe 7 are the second subframes, and a subframe 3, a subframe 4, a subframe 8, and a subframe 9 are uplink subframes;
when the uplink-downlink configuration of the first serving cell is the uplink-downlink configuration 1, the radio frame comprises 10 subframes, wherein a subframe 0, a subframe 4, a subframe 5, and a subframe 9 are the first subframes, a subframe 1 and a subframe 6 are either downlink subframes or the first subframes, a subframe 2 and a subframe 7 are the second subframes, and a subframe 3 and a subframe 8 are uplink subframes;

when the uplink-downlink configuration of the first serving cell is the uplink-downlink configuration 3, the radio frame comprises 10 subframes, wherein a subframe 0, a subframe 1, a subframe 5, and a subframe 9 are the first subframes, a subframe 6, a subframe 7, and a subframe 8 are either downlink subframes or the first subframes, a subframe 2 is the second subframe, and a subframe 3 and a subframe 4 are uplink subframes; or when the uplink-downlink configuration of the first serving cell is the uplink-downlink configuration 4, the radio frame comprises 10 subframes, wherein a subframe 0, a subframe 1, a subframe 4, a subframe 5, a subframe 8, and a subframe 9 are the first subframes, a subframe 6 and a subframe 7 are either downlink subframes or the first subframes, a subframe 2 is the second subframe, and a subframe 3 is an uplink subframe.

16. The method according to claim 12, wherein the sending or receiving, by the base station in the first serving cell, information to or from the first user equipment based on the frame structure comprises:

sending, by the base station to the first user equipment in a subframe n−4, a physical downlink shared channel or a downlink control channel that indicates downlink semi-persistent scheduling release, wherein the physical downlink shared channel or the downlink control channel that indicates the downlink semi-persistent scheduling release is transmitted in the first serving cell, and n is a nonnegative integer; and receiving, by the base station in a subframe n, a hybrid automatic repeat request acknowledgement that is fed back by the first user equipment and that is corresponding to the physical downlink shared channel or the downlink control channel in the subframe n−4, wherein the hybrid automatic repeat request acknowledgement corresponding to the physical downlink shared channel or the downlink control channel is transmitted in the first serving cell.

17. The method according to claim 12, wherein the sending or receiving, by the base station in the first serving cell, information to or from the first user equipment based on the frame structure comprises:

sending, by the base station to the first user equipment in a subframe i, a downlink control channel scheduling a physical uplink shared channel; and receiving, by the base station in a subframe i+k1, the physical uplink shared channel scheduled by the downlink control channel, wherein the physical uplink shared channel scheduled by the downlink control channel is transmitted in the first serving cell, i is a nonnegative integer, k1 is a positive integer, a value of k1 is determined according to timing when an uplink-downlink configuration in a frame structure type 2 is the same as the uplink-downlink configuration of the first serving cell, and the frame structure type 2 is a frame structure type of Long Term Evolution release 8, release 9, release 10, release 11, or release 12.

* * * * *